(12) United States Patent
Schemmel

(10) Patent No.: US 10,819,454 B1
(45) Date of Patent: Oct. 27, 2020

(54) VORTEX RADIOMETERS FOR COGNITIVE ANTENNA APPLICATIONS AND FADE PREDICTION TECHNIQUES

(71) Applicant: United States of America as represented by the Administrator of NASA, Washington, DC (US)

(72) Inventor: Peter J. Schemmel, Fairview Park, OH (US)

(73) Assignee: United States of America as Represented by the Adminstrator of National Aeronautics and Space Adminstration, Washington, DC (US)

( * ) Notice: Subject to any disclaimer, the term of this patent is extended or adjusted under 35 U.S.C. 154(b) by 0 days.

(21) Appl. No.: 16/697,369

(22) Filed: Nov. 27, 2019

Related U.S. Application Data

(60) Provisional application No. 62/773,498, filed on Nov. 30, 2018.

(51) Int. Cl.
*H04B 17/391* (2015.01)
*H04B 7/185* (2006.01)
*H01Q 3/36* (2006.01)

(52) U.S. Cl.
CPC ..... *H04B 17/3911* (2015.01); *H04B 7/18513* (2013.01); *H01Q 3/36* (2013.01)

(58) Field of Classification Search
CPC ............ H04B 17/3911; H04B 7/18513
See application file for complete search history.

(56) References Cited

U.S. PATENT DOCUMENTS

| 9,998,187 B2 * | 6/2018 | Ashrafi | ............... H04L 27/2639 |
| 2017/0343750 A1 * | 11/2017 | Ashrafi | ................... H04B 10/60 |
| 2019/0198999 A1 * | 6/2019 | Ashrafi | ..................... H04L 5/12 |
| 2019/0266712 A1 * | 8/2019 | Chirayath | ............... G06T 7/514 |

* cited by examiner

*Primary Examiner* — Md K Talukder
(74) *Attorney, Agent, or Firm* — Robert H. Earp, III; Mark Wolfgang; Helen M. Galus

(57) ABSTRACT

Vortex radiometers (VRs) for cognitive antenna applications and fade prediction techniques are disclosed. A VR may act as an early warning system for communication antennas by of measuring: (1) when a fade causing interference with or complete loss of communication signal will occur; (2) how long the fade will persist; and/or (3) how intense the fade will be. This may be accomplished by measuring atmospheric noise temperature with concentric annular antenna beam patterns.

20 Claims, 22 Drawing Sheets

200

210

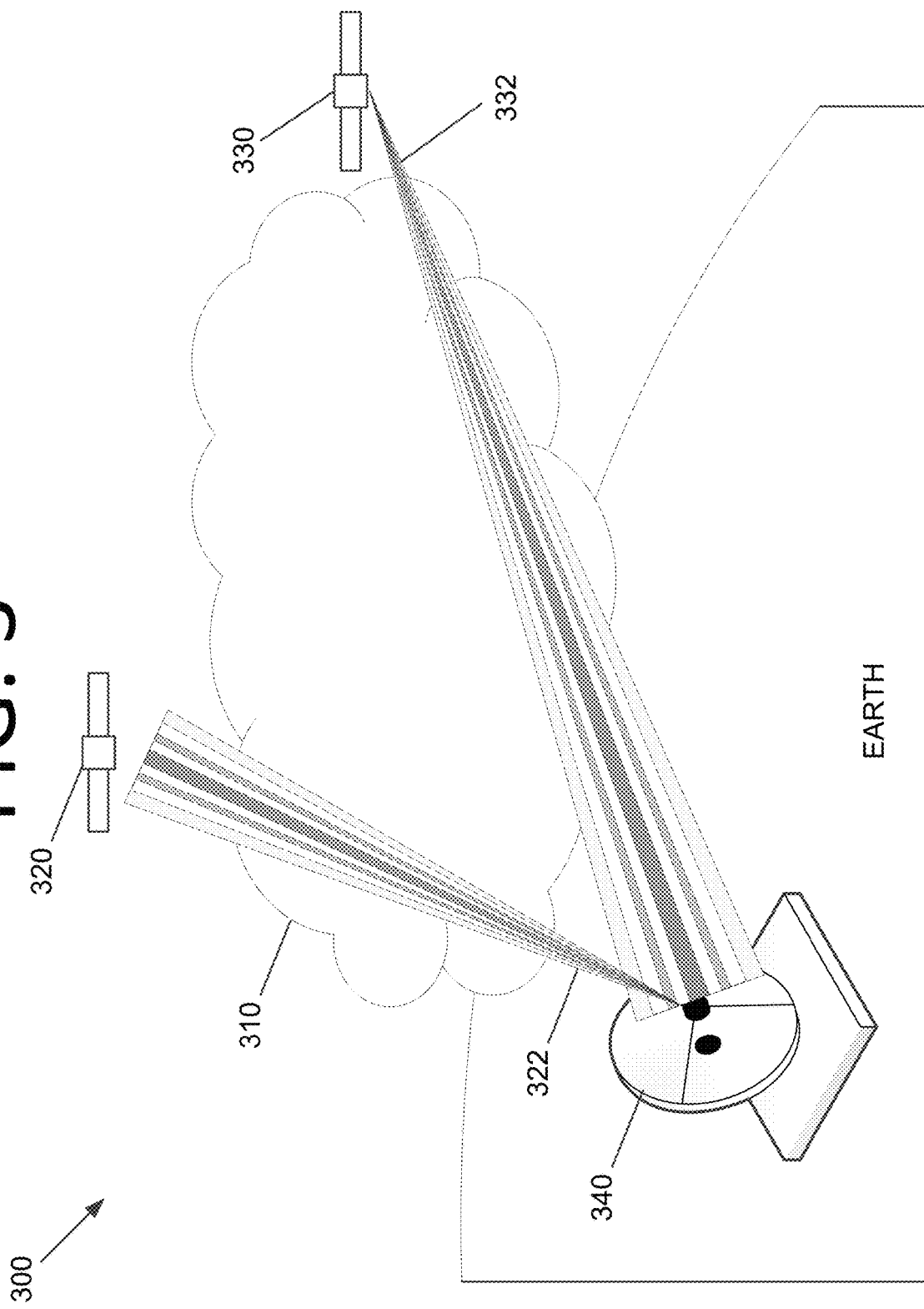

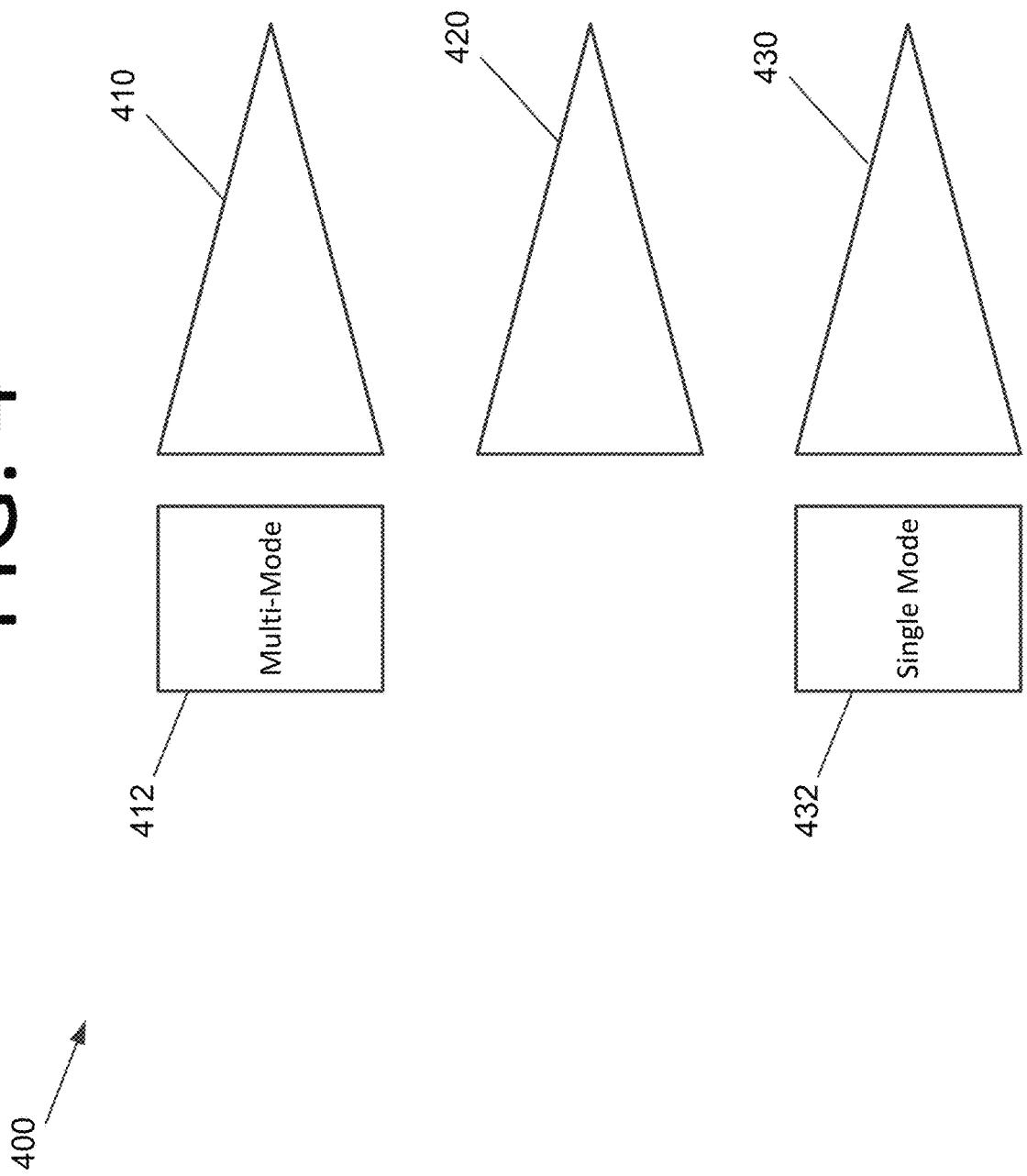

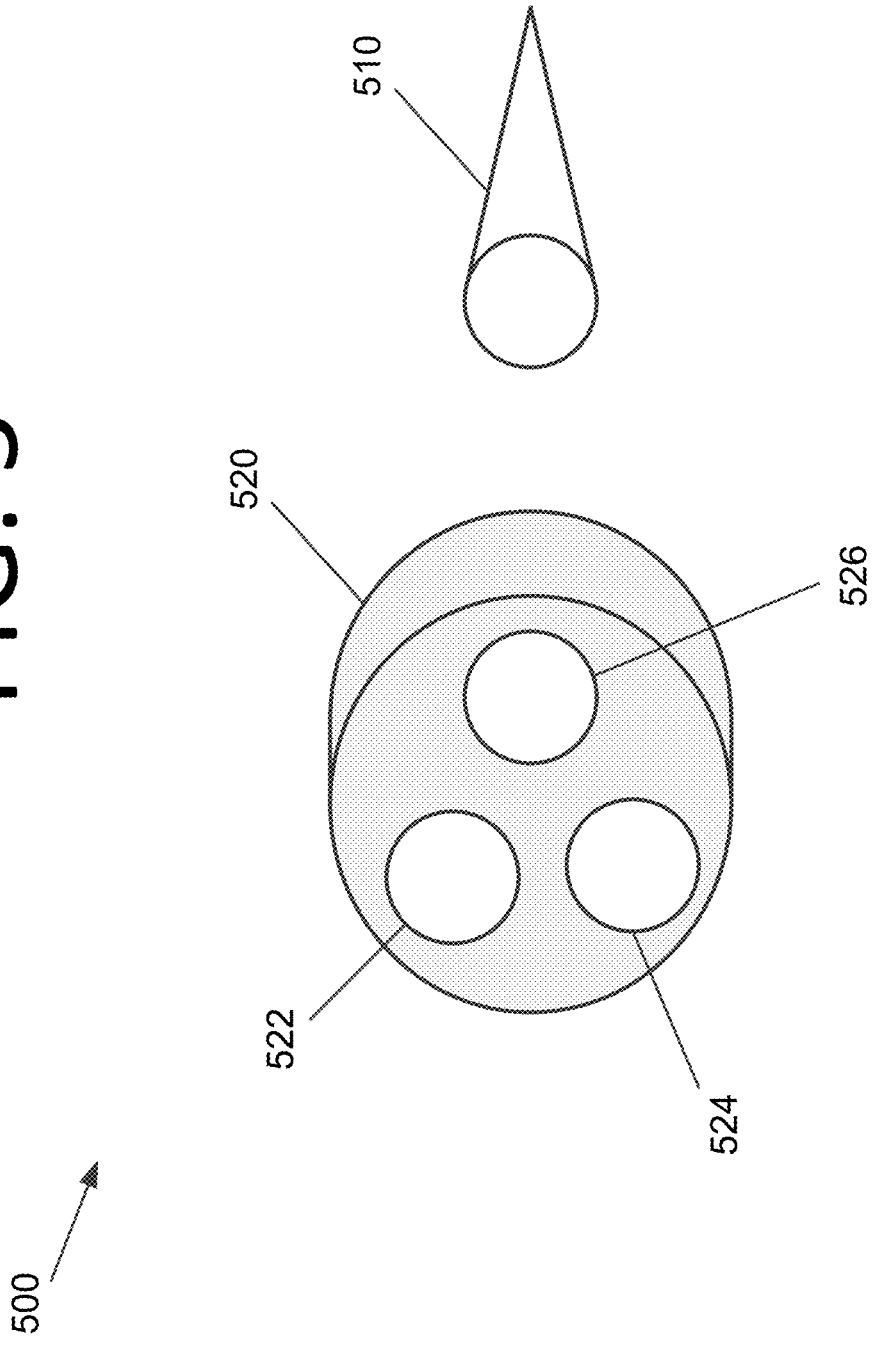

1220

1400

Start
↓
1410 — Impart OAM onto Radiometer Beams
↓
1420 — Measure Radiometric Data from each OAM Beam
↓
1430 — Track Noise Temperature Source
↓
1440 — Calculate Source Velocity, Eff. Diameter, Intensity
↓
1450 — Pass Information to Cognitive Antenna
↓
1460 — Perform Fade Mitigation
↓
End

VORTEX RADIOMETERS FOR COGNITIVE ANTENNA APPLICATIONS AND FADE PREDICTION TECHNIQUES

CROSS REFERENCE TO RELATED APPLICATION

This application claims the benefit of U.S. Provisional Patent Application Ser. No. 62/773,498 filed Nov. 30, 2018. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to antennas, and more particularly, to vortex radiometers for cognitive antenna applications and fade prediction techniques.

BACKGROUND

Radio frequency (RF) communication links on Earth and other free space communication links are susceptible to atmospheric effects (e.g., adverse weather), signal interference, and jamming that result in a reduction to the signal-to-noise ratio (SNR) received at one end of the link, which is commonly known as "fade." If the losses due to atmospheric effects, signal interference, or jamming are too high, the signal level could drop below the minimum measurable power of the receiver. When this happens, data sent across the communication link is lost. This is a significant problem when the data is highly sensitive, such as voice communications with the International Space Station, science data from rovers on Mars, emergency responder communications, etc. However, fade from atmospheric effects also impacts satellite television services and millimeter-wave communication links used for financial services, for example.

Fade-mitigation techniques have been developed to reduce the amount of lost data. Examples of fade-mitigation techniques include: (1) waiting to send data until the fade has ended; (2) error checking and re-sending missing data; (3) changing the communication frequency; (4) increasing the transmission power; (5) adjusting the modulation and/or coding scheme; and (6) transmitting data to a different receiver in the network. However, in order to know which fade mitigation technique to use, the communication system needs to know: (1) when the fade will occur; (2) how long the fade will last; and (3) how severe the fade will be. Without this information, the communication system could pick a fade-mitigation technique that over-mitigates, resulting in poor system efficiency. Alternatively, the communication system could choose a fade mitigation technique that under-mitigates, which would still result in lost data.

Some systems utilize predictive algorithms that track the communication link performance over time. These algorithms attempt to predict when fade is about to occur. However, atmospheric fades are stochastic in nature, meaning that they are randomly determined and rendering such predictions inaccurate. Accordingly, an improved system and improved techniques for measuring fade as it occurs and reacting accordingly may be beneficial.

SUMMARY

Certain embodiments of the present invention may be implemented and provide solutions to the problems and needs in the art that have not yet been fully solved by conventional antenna technologies. For example, some embodiments of the present invention pertain to vortex radiometers for cognitive antenna applications and fade prediction techniques.

In an embodiment, a method for predicting and mitigating fade includes imparting OAM onto a plurality of radiometer beams generated via a plurality of VRs and measuring radiometric data from each OAM beam of a plurality of OAM beams. The method also includes tracking a noise temperature source as the noise traverses the plurality of OAM beams using a peak finding algorithm and calculating a source velocity relative to a communication link, an effective diameter, and an intensity from the measured radiometric data and the noise temperature. The method further includes selecting and performing one or more fade mitigation techniques based on the calculated source velocity, effective diameter, and intensity.

In another embodiment, a method for predicting and mitigating fade using a cognitive antenna includes imparting OAM onto a plurality of radiometer beams generated via a plurality of VRs and measuring radiometric data from each OAM beam of the plurality of OAM beams. The method also includes tracking a noise temperature source as noise traverses the plurality of OAM beams using a peak finding algorithm and calculating a source velocity relative to a communication link, an effective diameter, and an intensity from the measured radiometric data and the noise temperature.

In yet another embodiment, a method includes imparting OAM onto a plurality of radiometer beams generated via a plurality of VRs and measuring radiometric data from each OAM beam of a plurality of OAM beams. The method also includes tracking a noise temperature source as the noise traverses the plurality of OAM beams using a peak finding algorithm and calculating a source velocity relative to a communication link, an effective diameter, and an intensity from the measured radiometric data and the noise temperature. The method further includes selecting and performing one or more fade mitigation techniques based on the calculated source velocity, effective diameter, and intensity. The plurality of radiometer beams exhibit annular intensity patterns with radii that scale with an OAM mode number.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is an architectural diagram illustrating a system implementing VRs for fade mitigation, according to an embodiment of the present invention.

FIG. 4 illustrates a multi-antenna system, according to an embodiment of the present invention.

FIG. 5 illustrates a single antenna system with a rotating radiometer wheel, according to an embodiment of the present invention.

DETAILED DESCRIPTION OF THE EMBODIMENTS

Figure 1:
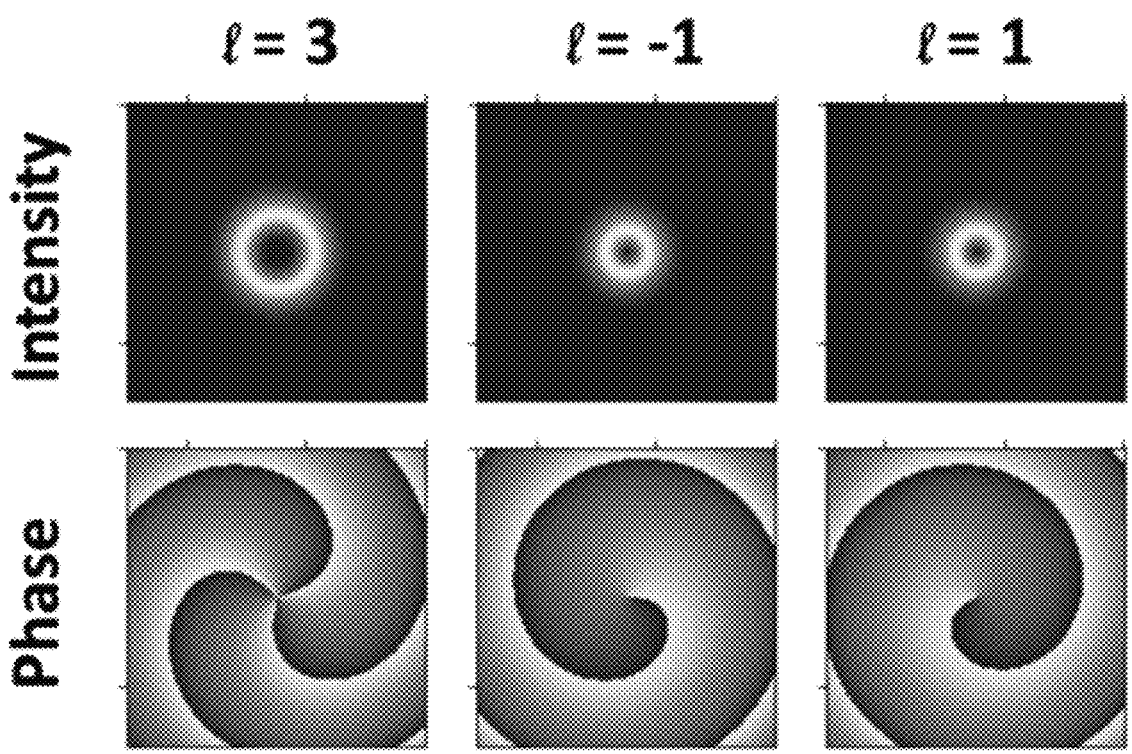
FIG. 1 illustrates intensity and phase patterns of orbital angular momentum (OAM) beams with various azimuthal mode numbers, according to an embodiment of the present invention.

Some embodiments of the present invention pertain to vortex radiometers (VRs) for cognitive antenna applications and fade prediction techniques. A VR may act as an early warning system for communication antennas by measuring: (1) when a fade causing interference with or complete loss of communication signal will occur; (2) how long the fade will persist; and/or (3) how intense the fade will be. This may be accomplished in some embodiments by measuring atmospheric noise temperature with concentric annular antenna beam patterns.

Annular beam patterns may be generated by imparting orbital angular momentum (OAM) into the electric field received by the antenna. Some embodiments pertain to a noise measurement system for estimating the impact of a noise source on a communication signal. In some embodiments, the noise measurement system includes a plurality of noise measurement signal receivers (e.g., antennae), with each of the signal receivers generating a separate annular antenna beam pattern (or any other signal shape that generally surrounds a central axis). In certain embodiments, each of the signal receivers includes an antenna with an OAM imparting element (e.g., a spiral phase plate) coupled thereto. Each of the OAM imparting elements may be configured to impart a different amount of OAM into its associated antenna signal, thus measuring a plurality of concentric noise measurement signals that surround the communication link emanating from a communication signal source (e.g., another antenna). It should be noted that in some embodiments, the VR is a passive system that does not generate a noise source on its own. Rather, the VR measures the noise temperature of observed objects.

In some embodiments, the noise measurement system includes a noise estimator configured to receive the noise measurement signal and calculate various noise parameters based on the received noise measurement signals. For example, noise temperature may be measured on each measured noise signal. A peak finding algorithm may be used in some embodiments to locate noise temperature peaks in time, and to subsequently determine the peak magnitude in decibel-milliwatts (dBm) for each measured noise signal. Correlated noise temperature peaks in adjacent noise signals can then be used by the noise estimator to determine: (1) the inward velocity of the noise temperature source; and (2) the effective radius of the source.

From these measured parameters, plus the magnitude of the noise temperature peaks, some embodiments can calculate the time at which the noise source will intercept the communication beam, the amount of time the source will persist over the communication beam, and the intensity of the fade. With this information, appropriate fade mitigation strategies can be implemented effectively and efficiently. These fade mitigation techniques include, but are not limited to: (1) waiting to send data until the fade has ended; (2) error checking and re-sending missing data; (3) changing the communication frequency; (4) increasing the transmission power; (5) adjusting the modulation and/or coding scheme; and/or (6) transmitting data to a different receiver in the network.

Monitoring Link Margins

More specifically, communication links fade when their power margin turns negative. The power margin is a measure of the residual signal strength at the receiver, beyond which is required to close the link. Power margins are designed to accommodate small changes in signal strength and ambient noise, ensuring that the link remains available. However, large power margins tend to be avoided, especially in commercial satellite systems, due to increased component weight and thermal management requirements associated with higher power systems.

The power margin itself can be defined as:

$$\Delta = 10\log_{10}\left(\frac{EsNO_{Rcvd}}{EsNO_{Req}}\right) \quad (1)$$

where $EsNO_{Req}$ is the energy per symbol to noise power spectral density required to close the link and is a function of the modulation, coding scheme, and desired bit error rate. $EsNO_{Rcvd}$ is given by:

$$EsNO_{Rcvd} = \left(\frac{RCoNO}{R_{sRF}}\right) \quad (2)$$

where $R_{sRF}$ is the symbol rate in symbols per second and RCoNO is given by:

$$RCoNO = \left(\frac{P_{Rcvd}}{T_{sys}k_b}\right) \quad (3)$$

where $P_{Rcvd}$ is the product of the effective isotropic radiated power (EIRP) of the transmitter, the free space and atmospheric path losses, and the gain of the receiving antenna, the system noise temperature $T_{sys}$ is a summation of the individual antenna and receiver noise temperatures (including sky brightness temperature), and $k_b$ is the Boltzmann constant. The link power margin diminishes as the system temperature increases, the received power decreases, or both.

Fortunately, microwave radiometers are capable of measuring noise powers, and hence sky brightness temperatures. Atmospheric effects on radio wave propagation have been studied extensively using radiometric data. Rain, clouds, fog, and snow are all known to increase sky brightness temperature and contribute to fades on communication links. Radiometers also measure interfering signals via an increase in noise power, which is interpreted as higher sky brightness temperatures. Thus, the factors that disrupt communication link availability, and hence reduce data throughput, are identifiable using radiometric measurement techniques.

Existing techniques can be used to collect radiometric data from the communication link itself, and doing so can help warn of impending fades. However, since the communication link itself is being monitored, such a measurement scheme does not provide ample time to determine whether fade mitigation techniques should be employed, and if so, what type of mitigation should be used. To allow time for such determinations, radiometric measurements from areas external to the communication link should be made.

Vortex Radiometry

Creating an antenna capable of measuring radiometric data in annular rings centered on a communication link is a challenge. It is possible to surround a communication antenna with several radiometers, but this is not cost effective. It is also possible to dynamically steer a phased array antenna beam concentrically around the communication link. However, this is a high complexity, high cost solution that is impractical for most scenarios. Instead, some embodiments employ a lower cost solution that can be retrofitted to existing antenna systems and integrated into future designs. One technique is to exploit the orbital angular momentum (OAM) property of light.

Waves carrying OAM exhibit a $2\pi l$ azimuthal phase shift normal to the propagation axis, where l is the azimuthal mode number, ranging from $-\infty$ to $+\infty$. The magnitude of l defines the number of branch points within the electric field, while the sign of l defines the rotational direction of the azimuthal phase shift. Viewed in three dimensions, waves carrying OAM contain l helically wrapped phased planes. This helical phase structure has led some to colloquially identify these waves as "vortex beams."

While the phase of a wave with OAM is helical, the intensity pattern is annular. This is a result of the phase being undefined at each branch point. The undefined phase means that the electric field is undefined, and without a field, it is impossible to have field intensity. The radius of maximum intensity of an annular ring is a function of l such that:

$$r_{max} = \omega\sqrt{\frac{|l|}{2}} \quad (4)$$

where $\omega$ is the beam radius. Therefore, increasing the magnitude of l increases the radius of the annular intensity ring. See intensity and phase patterns 100 of FIG. 1. Imparting OAM of different magnitudes into the electric fields received by the radiometer creates concentric beam patterns that can measure radiometric data.

There are various techniques to impart OAM into an electric field. However, the most straightforward technique may be the spiral phase plate (SPP). Spiral phase plates include a helically ramped dielectric material (e.g., SPP 200 of FIG. 2A) with a step height h tuned so that the phase thickness is a multiple of $2\pi l$, where $\lambda$ is the wavelength and n is the refractive index. The step height h is given by:

$$h = \frac{\lambda \cdot (l_{out} - l_{in})}{n_{spp} - n_{air}} \quad (5)$$

where $l_{out}$ is the azimuthal mode number of the OAM wave generated by the SPP, $l_{in}$ is the azimuthal mode number of the OAM wave incident to the SPP, $n_{spp}$ is the refractive index of the SPP, and $n_{air}$ is the refractive index of the air surrounding the SPP.

For large changes in azimuthal mode number, the step height h can become unreasonably large. This can be alleviated by creating a modular SPP that includes |l| individual $\Delta l=1$ SPPs combined together. Imparting OAM into an electric field using an SPP merely involves placing the SPP in front of the antenna aperture.

One scheme for efficiently applying fade mitigation in order to maximize data throughput includes measuring radiometric data from an annular ring (or multiple annular rings) around the communication link. This is achievable by imparting OAM with different azimuthal mode number magnitudes into the received electric field by using SPPs placed in front of the antenna aperture. "Vortex Radiometers" is the suggested name for such systems.

VRs create annular beam patterns by exploiting the orbital angular momentum (OAM) nature of electromagnetic fields. These annular beams measure radiometric data around a communication link, allowing VRs to detect noise sources before they interact with the link. Basic VR capability has been demonstrated on a simulated 100 Mbps GEO-to-ground communication link.

In those simulations, a noise source traversed across the communication beam, and without VR capabilities available, the link faded. However, when the VR was used, fade mitigation was successfully applied to maintain the link. The simulation observed noise temperatures measured by the VR and communication link. If the noise temperature recorded by the VR was above a threshold temperature, fade mitigation was enabled. Mitigation was disabled when the VR noise temperature fell below the threshold.

Previous VR simulations also showed that small noise sources, relative to the VR beam size, could slip past the detection algorithm. Reducing the azimuthal mode number of the VR beam, remedied the problem. However, multi-beam VRs should be considered for this signal. Such multi-beam VRs can detect both large and small noise sources in some embodiments.

Unmanned aerial vehicles (UAVs) and CubeSats fall into the small noise source category. As such, mitigation of signal interference and jamming from these platforms typically requires multi-beam VR systems. While multi-beam VRs are more complex from a hardware perspective, they provide the ability to use more advanced fade detection algorithms.

One nonlimiting example of an advanced algorithm is provided in the following section. Therein, noise sources are identified and their relative velocities are calculated. Analysis of the radiometric data then provides the ability to estimate: (1) when the fade will occur; (2) how long the fade will persist; and (3) how intense the fade will be. This algorithm was demonstrated on a simulated Ka-Band communication link that switches to X-Band in order to avoid interference-induced fades.

Figure 2A:
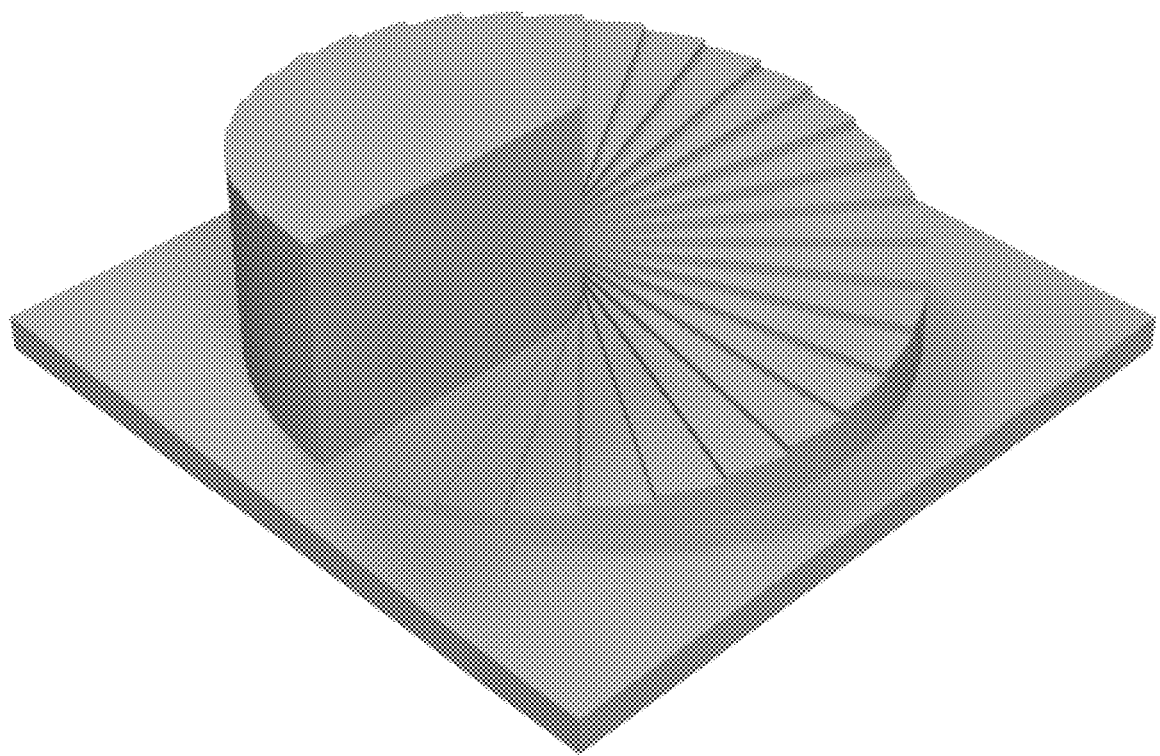
FIG. 2A is a solid model rendering of a spiral phase plate designed to create OAM with an azimuthal mode number of +1 at 26 GHz, according to an embodiment of the present invention.
Figure 2B:
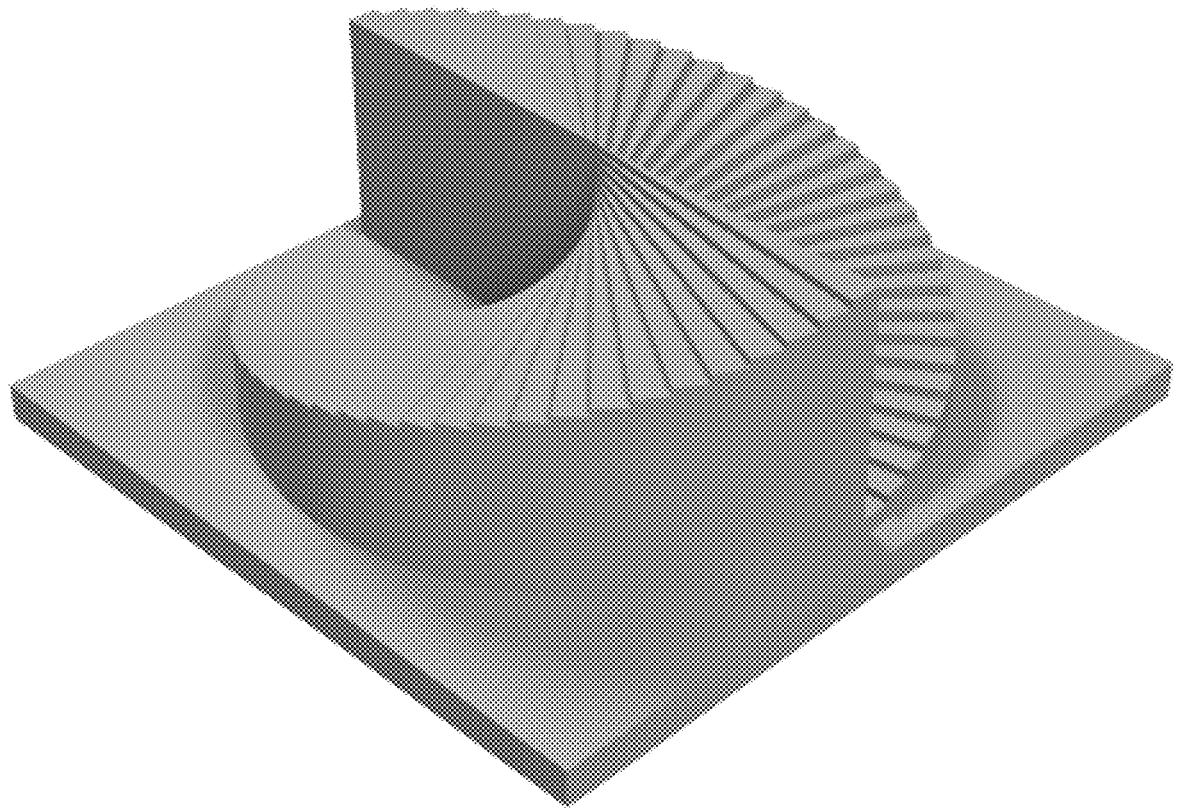
FIG. 2B is a solid model rendering of a spiral phase plate designed to create OAM with an azimuthal mode number of ±2 at 26 GHz, according to an embodiment of the present invention.

While a single mode can be achieved via a single helical ramp, as in FIG. 2A, some embodiments include multiple ramps in order to increase the mode number. For instance, two ramps, three ramps, five, ramps, ten ramps, or any other desired number of ramps can be used without deviating from the scope of the invention. For instance, an SPP 210 with two ramps is shown in FIG. 2B. The math is doubly infinite, with the azimuthal mode number ranging from minus infinity to positive infinity.

Such a multi-mode SPP could be placed in front of a horn antenna, for example, and may work in both transmitting and receiving mode. However, any other antenna design may be used without deviating from the scope of the invention, whether low or high gain. For instance, dipoles may be used. However, much of the energy would radiate away from the SPP. Such SPPs may be used for satellites, ground stations, aircraft, a cellular communications tower, or any other desired platform without deviating from the scope of the invention. In the case of a satellite, an annular beam may cover a relatively large area, such as the entire state of Ohio.

FIG. 3 is an architectural diagram illustrating a system 300 implementing VRs for fade mitigation, according to an embodiment of the present invention. An atmospheric disturbance (in this case, storm clouds 310) is located between a satellites 320, 330 and a ground station 340. By using annular beam patterns 322 (uplink) and 332 (downlink) generated by one or more VRs, satellites 320, 330 are able to predict when fade will occur due to the storm, how long the fade will last, and how severe the fade will be. It should be noted that each of satellites 320, 330 are capable of both downlink and uplink communications. Satellites 320, 330 can then employ one or more fade mitigation techniques including, but not limited to, waiting to send data until the fade has ended, performing error checking and re-sending missing data, changing the communication frequency, increasing the transmission power, adjusting the modulation and/or coding scheme, transmitting data to a different receiver in the network, any combination thereof, etc.

FIG. 4 illustrates a multi-antenna system 400, according to an embodiment of the present invention. Multi-antenna system 400 includes three horn antennas 410, 420, 430 in this embodiment. However, any desired number and type of antennas may be used without deviating from the scope of the invention.

Middle antenna 420 does not have an SPP and functions as a normal antenna. However, antenna 410 and antenna 430 have a multi-mode SPP 412 and a single mode SPP 432 in their respective beam paths. Using multiple antennas that each have their own SPP (either single mode or multi-mode) may mitigate the requirement for mechanically rotating components (see FIG. 5). Using multiple antennas also has the benefit of monitoring all VR beams all the time. In single antenna system 500 of FIG. 5, on the other hand, only one VR beam is active at a particular time. That time can be very short, but there will still be some amount of time where a particular mode is not active.

FIG. 5 illustrates a single antenna system 500 with a rotating radiometer wheel 520, according to an embodiment of the present invention. In FIG. 5, the components are separated and not to scale to illustrate the concept. In this embodiment, a single horn antenna 510 is used. However, rotating radiometer wheel 520 is located in front of the opening of horn antenna 510 which could be rotated via an electric motor, for example (not shown). Radiometer wheel 520 includes an opening 522 with no SPP and two openings 524, 526 that include SPPs, potentially having different mode numbers. However, any number of SPPs and/or mode numbers may be used without deviating from the scope of the invention. Radiometer wheel 520 is rotated such that openings 522, 524, 526 are in front of horn antenna 510 at different times and signals pass therethrough. In some embodiments, radiometer wheel 520 is continuously and rapidly rotated. In certain embodiments, radiometer wheel 520 pauses for a time at each opening 522.

Figure 6:
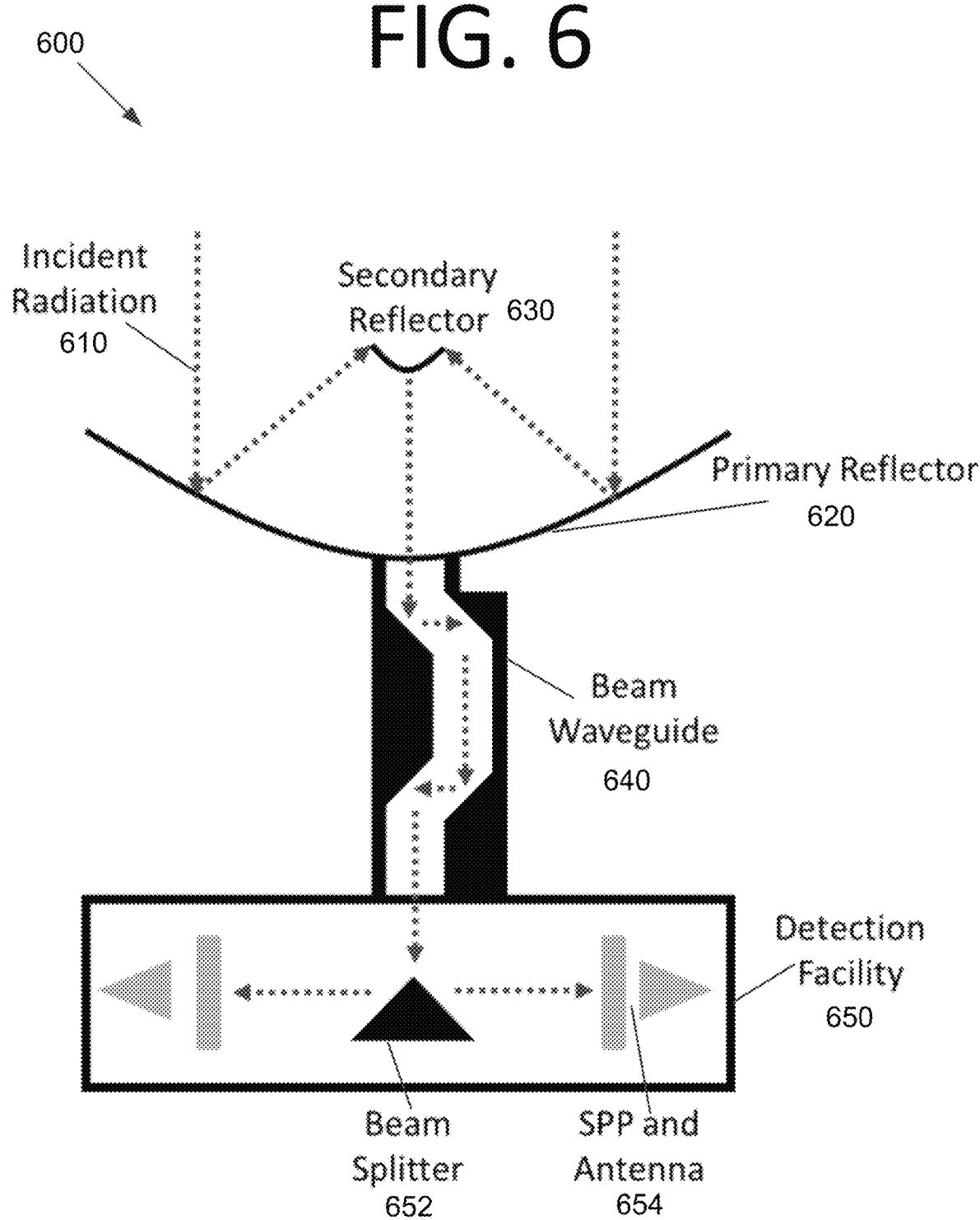
FIG. 6 illustrates a beam waveguide antenna system that allows multiple signals to be sent and received through a dish at the same time, according to an embodiment of the present invention.

FIG. 6 illustrates a beam waveguide antenna (BWGA) system 600 that allows multiple signals to be sent and received through a dish at the same time, according to an embodiment of the present invention. BWGA system 600 utilizes a relatively large reflecting aperture (i.e., the combination of primary reflector 620 and secondary reflector 630) to focus received incident radiation 610 onto a beam waveguide 640, which is a series of mirrors contained in a conductive tube structure. The series of mirrors direct incident radiation 610 to a location below the base of BWGA 600, namely, detection facility 650. At this location, the radio energy exits the conductive tube structure and passes through a beam splitter 652 the splits incident radiation 610 into separate beams, each of which is measured by a separate detector (i.e., SPP and antenna 654). In this embodiment, each separate detector contains an SPP with a different mode number. As in some embodiments discussed above, the separate SPPs create beams with different annular diameters, and thus can be used as a VR.

Noise Source Parameter Estimation

Changing frequency bands does not happen instantaneously. Efficient migration to a new band typically requires information about an impending noise source. Cognitive antennas need to know, for example, when to make the frequency change and how long to stay operating at the new frequency before it is safe to return to the previous frequency. The intensity of the impending fade may also be a factor in determining the optimum fade mitigation strategy. The example algorithm provided herein is capable of providing this information to cognitive systems.

Figure 7:
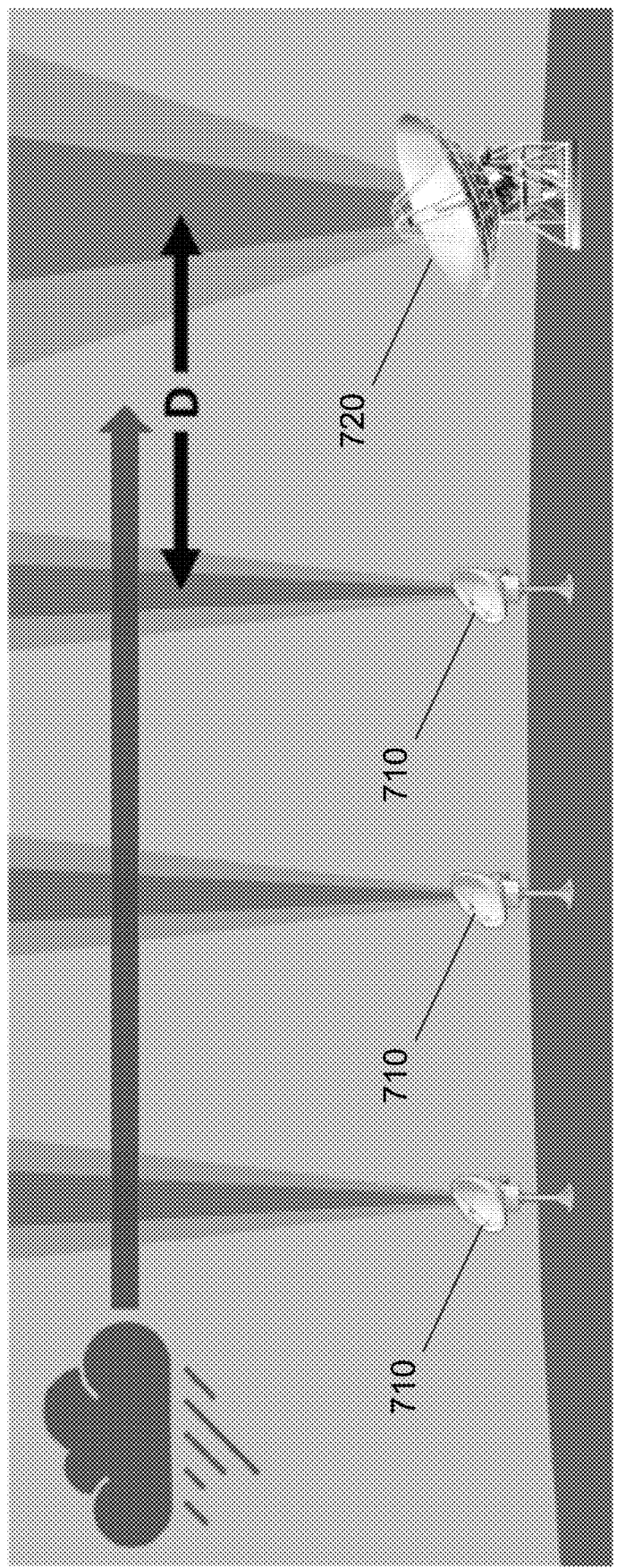
FIG. 7 illustrates several cascaded radiometers that determine noise source velocity and time of incidence (TOI) from peaks in measured sky brightness temperature time series, according to an embodiment of the claimed invention.

Referring to FIG. 7, a noise estimation system 700 is shown, according to an embodiment of the present invention. System 700 includes a plurality of linear cascaded standard radiometers 110 that produce Gaussian beam patterns. Radiometers 710 are used to determine noise source velocity and time-of-impact (TOI) from peaks in measured sky brightness temperature time series. It should be noted that system 700 is provided by way of example to simplify the derivation of principles used for various embodiments, including the OAM signals described herein.

For system 700, a minimum of two radiometer beams should be used. Identifying a noise source is the first step in the process of some embodiments. This may be accomplished by monitoring sky brightness temperature with a radiometer (e.g., one of radiometers 710). Under clear sky conditions, radiometer 710 will measure a constant brightness temperature for fixed azimuth and elevation angles. However, measured brightness temperatures increase when rain, the sun, or an interfering signal passes through the beam pattern of the antenna. As the noise source vacates the beam, the brightness temperature returns to its clear sky value.

Figure 8:
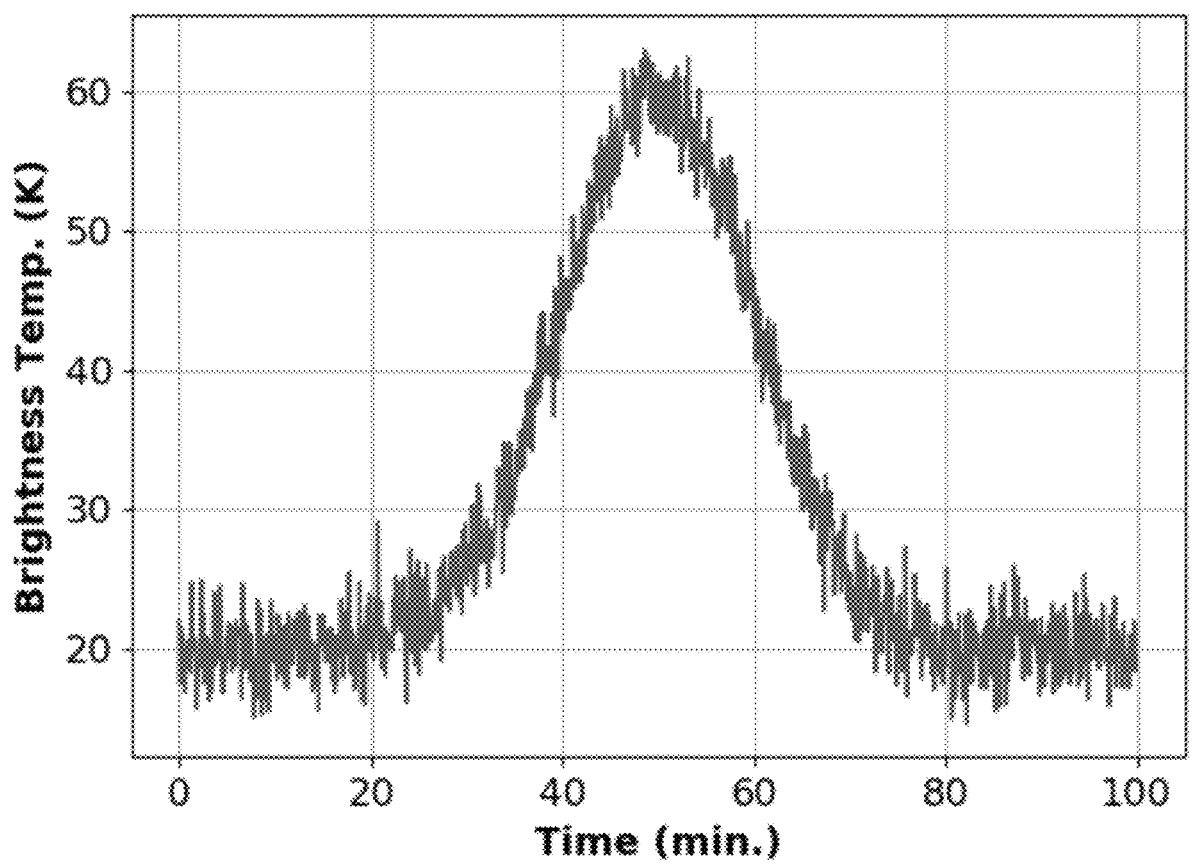
FIG. 8 is a graph illustrating the sky brightness temperature peak produced by a noise source traversing a beam pattern of a radiometer, according to an embodiment of the present invention.

The resulting temperature peak (see graph 800 of FIG. 8), coupled with the known orientation of radiometer 710 used to measure that peak, determines the angular position of the noise source at a particular time. For simplicity, the remainder of this disclosure assumes that the altitude of the noise source is known. However, in certain embodiments, the altitude may be measured via a profiling radiometer or LIDAR system. In the case of interfering unmanned aerial vehicles (UAVs) or CubeSats, the altitude may already be known from other sources, such as air traffic control. In practice, this can be measured with a profiling a radiometer, radar, or LIDAR system. The noise source can now be identified and located.

Once the noise source is identified, its velocity relative to a communication link (e.g., communications between a ground station 720 and a satellite (not shown)) should be measured. This may be accomplished by identifying the source with a second radiometer using the same pointing angle as the first radiometer but displaced by a known linear distance (see FIG. 7). Assuming that the altitude of the noise source is known, the relative velocity $V_{est}$ of the noise source is then given by:

$$V_{est} = \frac{D_{n+1} - D_n}{t_{n+1} - t_n} \quad (6)$$

where $D_{n+1}-D_n$ is the distance between the points of maximum gain of radiometer n and radiometer n+1 at the altitude of interest and $t_n$ and $t_{n+1}$ are the times at which the noise source was identified at radiometer n and radiometer n+1, respectively. Adding additional radiometers along the path provides for several measurements to be averaged, resulting in a statistical distribution of possible velocities. When the relative velocity $V_{est}$ and distance $D_A$ from the noise source to a communication link are known, it is possible to calculate the TOI, which is given by:

$$TOI = \frac{D_A - D_n}{V_{est}} + t_n \quad (7)$$

The TOI indicates when the maximum noise temperature will be recorded by the communication link. However, TOI on its own does not indicate when the fade will begin or end. This requires an estimate of the fade persistence (i.e., how long the fade will remain over the communication link).

Estimating fade persistence typically requires knowledge of: (1) the minimum sky brightness temperature that will cause the communication link to fade; (2) how the minimum sky brightness temperature relates to the temperature recorded by radiometers 710; and (3) how long did radiometers 710 record noise temperatures above that threshold. The noise temperature limit $T_{Lim}$ that will cause the communication link to fade is given by:

$$T_{Lim} = \frac{P_{RF} \cdot G_R}{k_b \cdot R_{sRF} EsNO_{Req}} \quad (8)$$

where $P_{RF}$ is the RF signal power at the receiver, $G_R$ is the receiver gain, $k_b$ is the Boltzmann constant, $R_{sRF}$ is the symbol rate (symbols per second), and $EsNO_{Req}$ is the modulated per-symbol energy-to-noise power spectral density ratio required to close the link, which is a function of the modulation, coding scheme, and desired bit error rate (BER).

If the radiometer and communication antenna patterns are the same, $T_{Lim}$ is the same for both systems. However, if the beam patterns differ, the temperatures measured by radiometers 710 will not necessarily be equal to the temperatures seen by the communication link. A good estimator relating $T_{Lim}$ to the measured radiometer temperatures $T_{VR_{Lim}}$ was found to be:

$$T_{VR_{Lim}} = \frac{I_{VR}}{I_{Comm}} \cdot (T_{Lim} - T_{sky}) + T_{sky} \quad (9)$$

Figure 9:
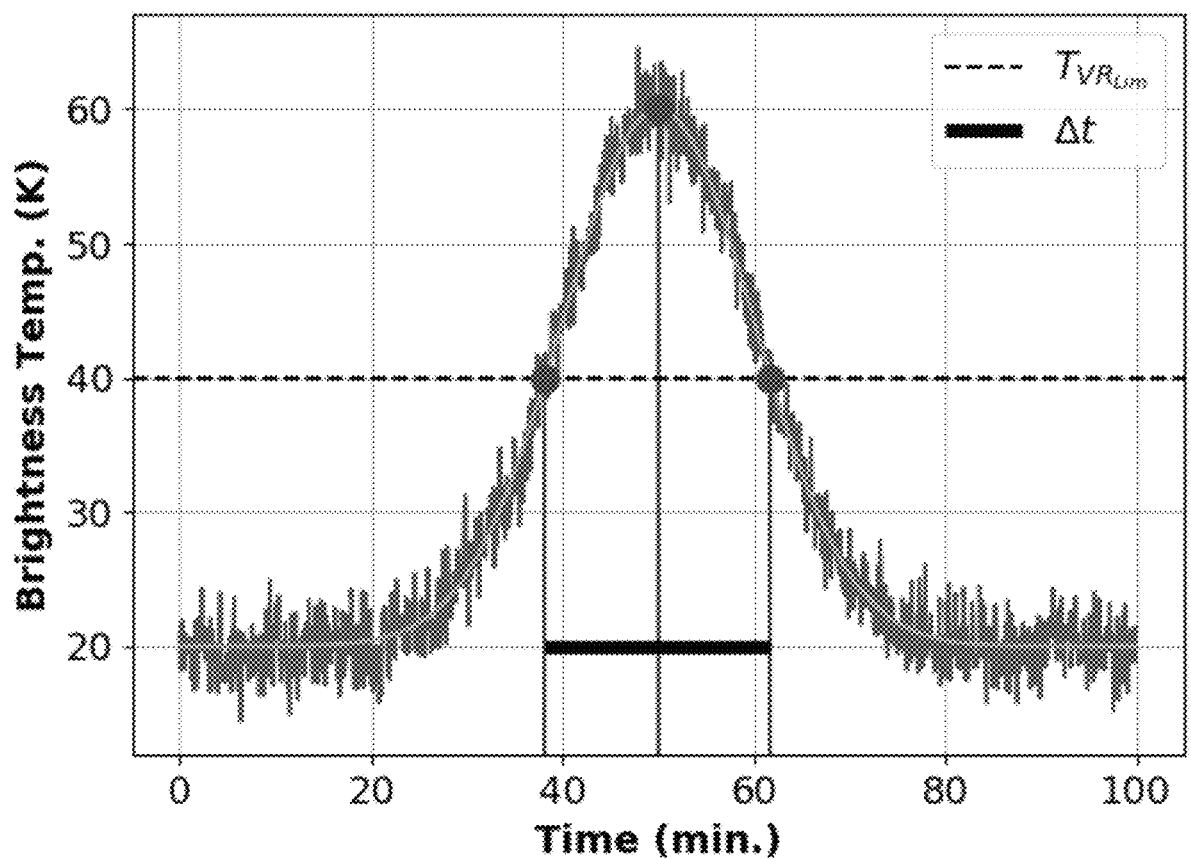
FIG. 9 is a graph illustrating the sky brightness temperature peak produced by a noise source traversing a beam pattern of a radiometer with fade persistence included, according to an embodiment of the present invention.

Here, $T_{sky}$ is the clear sky brightness temperature, while $I_{VR}$ and $I_{Comm}$ are the peak gains of the radiometer and the communication beam patterns, respectively. The time over which the VR measures an identified noise source temperature above $T_{VR_{Lim}}$ is denoted Δt, which is the first parameter to determine fade persistence (see graph 900 of FIG. 9).

The final parameter to estimate fade persistence is the relative width of the radiometer to communication antenna beams. This is calculable from knowledge of the antenna far-field beam patterns. This ratio $R_w$ can be found by first determining the antenna pattern with the lowest peak gain $G_{Min}$. The gain threshold $G_{Thres}$ can be taken to be half of the peak gain:

$$G_{Thres} = 0.5 \cdot G_{Min} \tag{10}$$

The beam diameter $\Theta$ can then be calculated for each antenna at $G_{Thres}$. This results in a width ratio of:

$$R_w = \frac{\Theta_{VR}}{V_{Comm}} \tag{11}$$

The fade persistence $I_{persist}$ can be estimated with:

$$I_{persist} = \frac{\Delta t}{R_w} \tag{12}$$

The impact initiation time (IIT), i.e., the time at which the communication link begins to fade, is given by:

$$IIT = TOI - 0.5 \cdot t_{persist} \tag{13}$$

and the impact release time (IRT), i.e., the time at which the communication link will no longer be in a fade, is given by:

$$IRT = TOI + 0.5 \sim t_{persist} \tag{14}$$

When the fade will occur and how long the fade will persist are now known. The final parameter estimation is the fade intensity. The first step is to estimate the anticipated noise temperature that will be seen by the communication link by rewriting Eq. (9) as:

$$T_{est} = \frac{I_{Comm}}{I_{VR}} \cdot (T_{VR} - T_{sky}) + T_{sky} \tag{15}$$

Readings from several radiometers can be averaged to produce a statistical probability distribution of $T_{est}$, resulting in a better estimate. The impact of the anticipated temperature increase on the power margin of the communication link can be determined by recalculating the receiver carrier-to-noise ratio as:

$$RCoNO' = \frac{P_{RF}}{T_{est} + k_b} \tag{16}$$

The reduced EsNO becomes:

$$EsNO' = \frac{RCoNO'}{R_{sRF}} \tag{17}$$

which makes the anticipated link margin:

$$\Delta' = 10\log_{10}\left(\frac{EsNO'}{EsNO_{Req}}\right) \tag{18}$$

The communication link will be under a fade if the reduced link margin $\Delta'$ is negative.

More specifically, communication links fade when their power margin turns negative. The power margin is a measure of the residual signal strength at the receiver. Power margins are designed to accommodate small changes in signal strength and ambient noise, ensuring that the link remains available. However, large power margins tend to be avoided, especially in commercial satellite systems, due to increased component weight and thermal management requirements associated with higher power systems.

Figure 10:
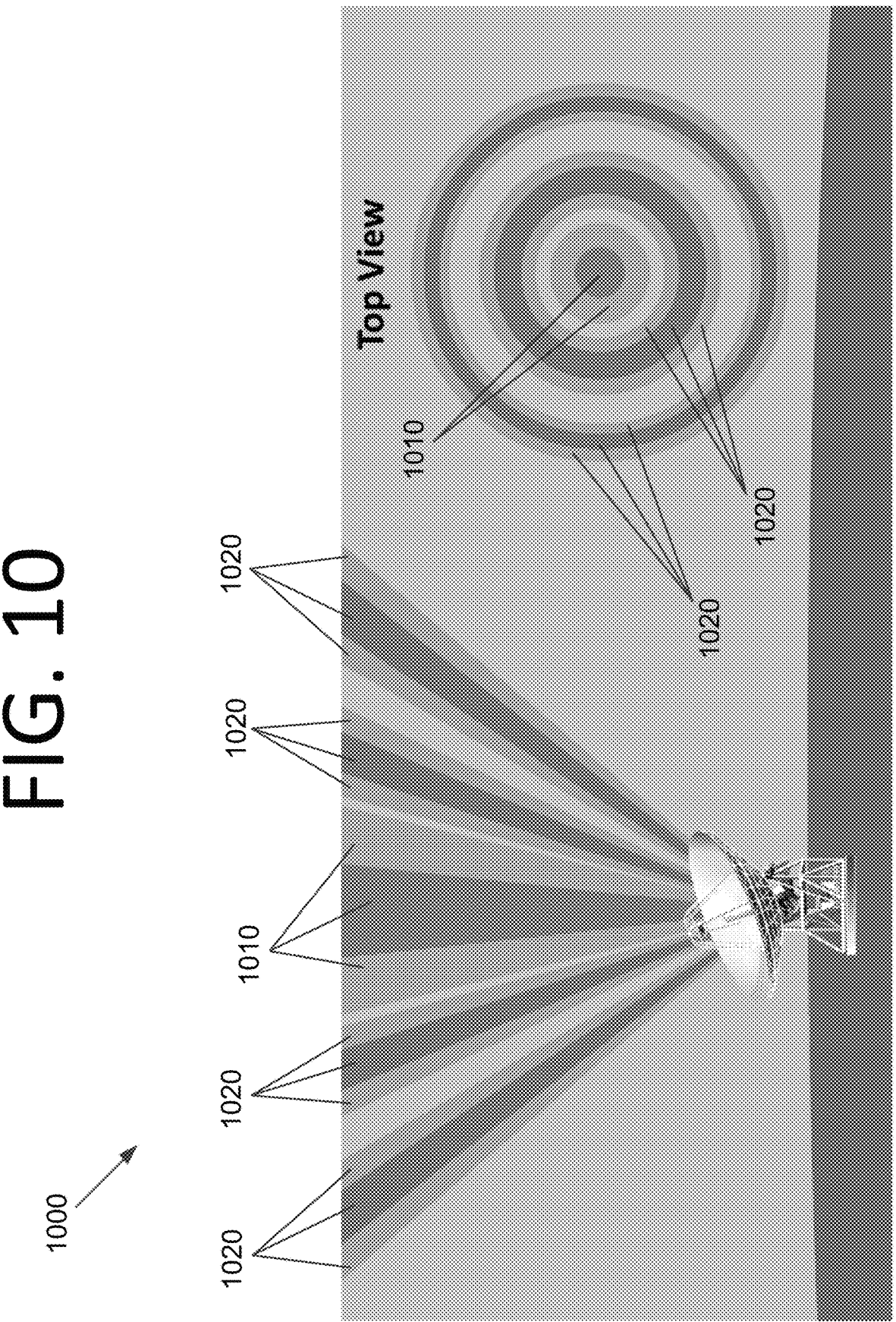
FIG. 10 illustrates a noise detection system with concentric annular radiometric beam patterns that can be used to determine fade characteristics prior to a noise source impinging upon a communication link, according to an embodiment of the present invention.

While this set of equations was developed by envisioning system 700, the equations are also applicable to systems using VRs. An example of such a system is noise estimation system 1000 of FIG. 10. In system 1000, concentric annular radiometric beam patterns (i.e., VR beams) 1020 can be used to determine fade characteristics prior to a noise source impinging upon a communication link 1010. In FIG. 10, communication link 1010 is surrounded by two VR beams 1020, where the light grey regions depict the reduced gain regions of the antenna. Concentric annular beams are achieved by adjusting the radius of individual beams by increasing the azimuthal mode number of the imparted OAM. For instance, one concentric beam could be one mile in diameter, another could be two miles, another could be five miles, etc. The more annular beams that are provided, the better the fade mitigation system functions in some embodiments.

Noise temperature is measured on each OAM radiometer channel. These parameters can then be used to employ an improved or optimal fade mitigation technique. However, the annular beam structure associated with VRs creates some additional effects that should be considered.

Figure 11:
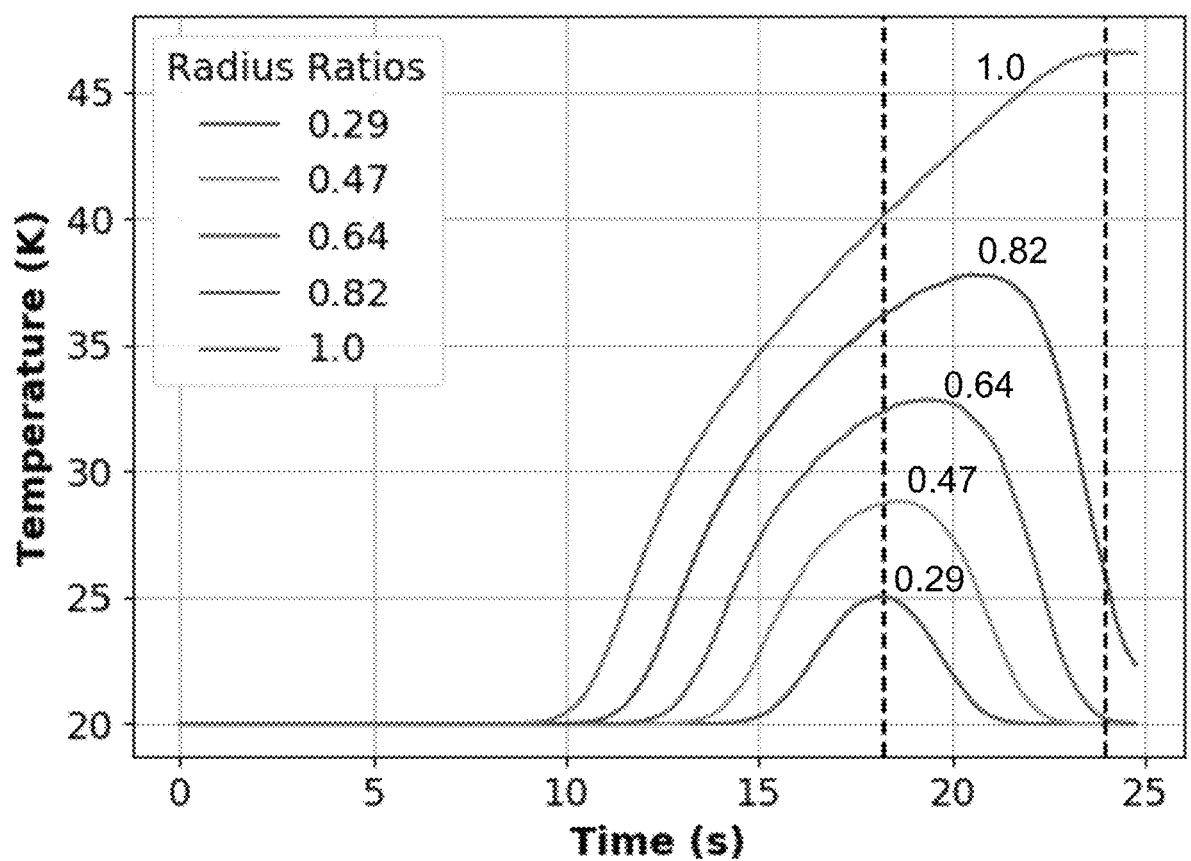
FIG. 11 is a graph illustrating noise temperature time series for different ratios of noise source radius to annular beam radius, according to an embodiment of the present invention.

The primary issue with respect to using annular VR beams is that noise sources with relatively large diameters will skew the measured noise temperature time series. This is a result of overlapping an annulus with a circle. A circle of small diameter intersecting a larger annular beam is similar to using a standard Gaussian beam pattern and produces symmetric peaks. However, as the diameter of the circle increases, the peak temperature shifts towards the center of the annulus. This effect is demonstrated in graph 1100 of FIG. 11. More specifically, FIG. 11 shows noise temperature time series for different ratios of noise source radius to annular beam radius. It is clear from graph 1100 that the time series skews inward as the ratio is increased.

Increased skewness in the measured noise temperature time series results in improper determination of the time at which the noise source is over points of maximum antenna gain. This adversely impacts the relative velocity (Eq. (6)) and TOI (Eq. (7)) estimates. FIG. 11 shows that skewness increases as the ratio of noise source radius to maximum intensity radius of the orbital angular momentum (OAM) beam increases. The radius of maximum intensity of an OAM beam is given by Eq. (4) above. Therefore, the impact of skewness can be reduced by increasing the azimuthal mode number associated with the VR antenna pattern. It is clear from this result that multi-beam VR systems should be used to detect noise sources of various sizes.

The set of equations within this section provide a mechanism to estimate: (1) when a fade will occur; (2) how long the fade will persist; and (3) how intense the fade will be. These estimations are valid for noise sources with effective radii that are less than the maximum intensity radius of the OAM mode used in the VR. Therefore, the parameter estimation is well suited to detecting small noise sources such as UAVs and CubeSats that pose a particularly difficult challenge to high priority communication systems. The following simulation section demonstrates the effectiveness of this estimation routine by simulating a 100 Mbps, Ka-Band, GEO-to-ground communication link. A multi-beam VR will track a small noise source, detect the impending fade, and instruct the Ka-Band link to change frequency band to maintain the link.

Simulation

The proliferation of UAVs and CubeSats poses an interference risk to high priority communication systems. Fortunately, data gathered by VRs can be used to estimate noise source characteristics and supply relevant parameters to a cognitive antenna, which CAN apply appropriate fade mitigation. This simulation demonstrates how VRs help cognitive antennas change frequency bands to avert fade events.

In this simulation, a primary 100 Mbps, Ka-Band, GEO-to-ground link is used in conjunction with a dual beam VR. A secondary, co-located X-Band system is available to take over communications in case the Ka-Band link fails. Table I below provides the parameters for both links.

TABLE I

SIMULATED COMMUNICATION LINK PARAMETERS

|  | Ka-Band |  | X-Band |  |
| --- | --- | --- | --- | --- |
| Parameter: | Value: | Units: | Value: | Units: |
| Frequency | 26 | GHz | 10 | GHz |
| Transmitter Power | 0.75 | W | 0.75 | W |
| Transmitter Aperture Diameter | 0.55 | m | 0.55 | m |
| Modulation | BPSK | — | BPSK | — |
| Coding Scheme | Uncoded |  | Uncoded |  |
| Data Rate | 100 | Mbps | 100 | Mbps |
| BER | 1E-6 | — | 1E-6 | — |
| Range | 35786 | km | 35786 | km |
| Receiver Aperture Diameter | 1.2 | m | 4 | m |
| Sky Brightness Temperature | 40 | K | 40 | K |
| Sky Brightness Temperature Standard Deviation | 0.25 | K | 0.25 | K |

A noise source, with parameters outlined in Table II below, traverses across the Ka-Band link.

TABLE I

SIMULATED COMMUNICATION LINK PARAMETERS

| Parameter: | Value: | Units: |
| --- | --- | --- |
| Equivalent Brightness Temperature | 800 | K |
| Radius | 15, 30, 50 | m |
| Velocity | 100 | m/s |

Without VR capabilities enabled, the Ka-Band link undergoes a fade and data transmission is disabled. However, when VR capabilities are utilized, the noise source parameters are estimated using the equations given above. Doing so alerts the cognitive antenna controlling communications to the impending fade. At the appropriate time, the cognitive antenna changes operations to the X-Band system, maintaining data throughput while the noise source is obscuring the Ka-Band link.

Simulation results are shown in FIGS. 12A-F, where VRs utilize time series noise temperature data to estimate: (1) when a fade will occur; (2) how long the fade will persist; and (3) how intense the fade will be. This data is then used to enable a frequency change from Ka-Band to X-Band in order to mitigate the fade. Parameter estimations are compared to actual values in Table III below.

TABLE III

NOISE SOURCE ESTIMATED PARAMETERS

| Noise Source Radius |  | 15 m |  | 30 m |  |
| --- | --- | --- | --- | --- | --- |
| Parameter: | Units: | Estimation: | Actual: | Estimation: | Actual: |
| Velocity | m/s | 101.79 | 100 | 98.91 | 100 |
| Brightness Temperature | K | 127.34 | 130.47 | 303.78 | 328.05 |
| TOI | s | 4.96 | 5.01 | 5.02 | 4.98 |
| Persistence | s | 1.37 | 0.77 | 2.74 | 1.36 |
| Noise Source Radius |  | 50 m |  | 50 m Revised |  |
| Velocity | m/s | 100.61 | 100 | 100.25 | 100 |
| Brightness Temperature | K | 602.67 | 597.64 | 600.77 | 597.67 |
| TOT | s | 5.01 | 5.04 | 5.02 | 5.04 |
| Persistence | s | 3.96 | 1.84 | 4.47 | 1.84 |

Figure 12A:
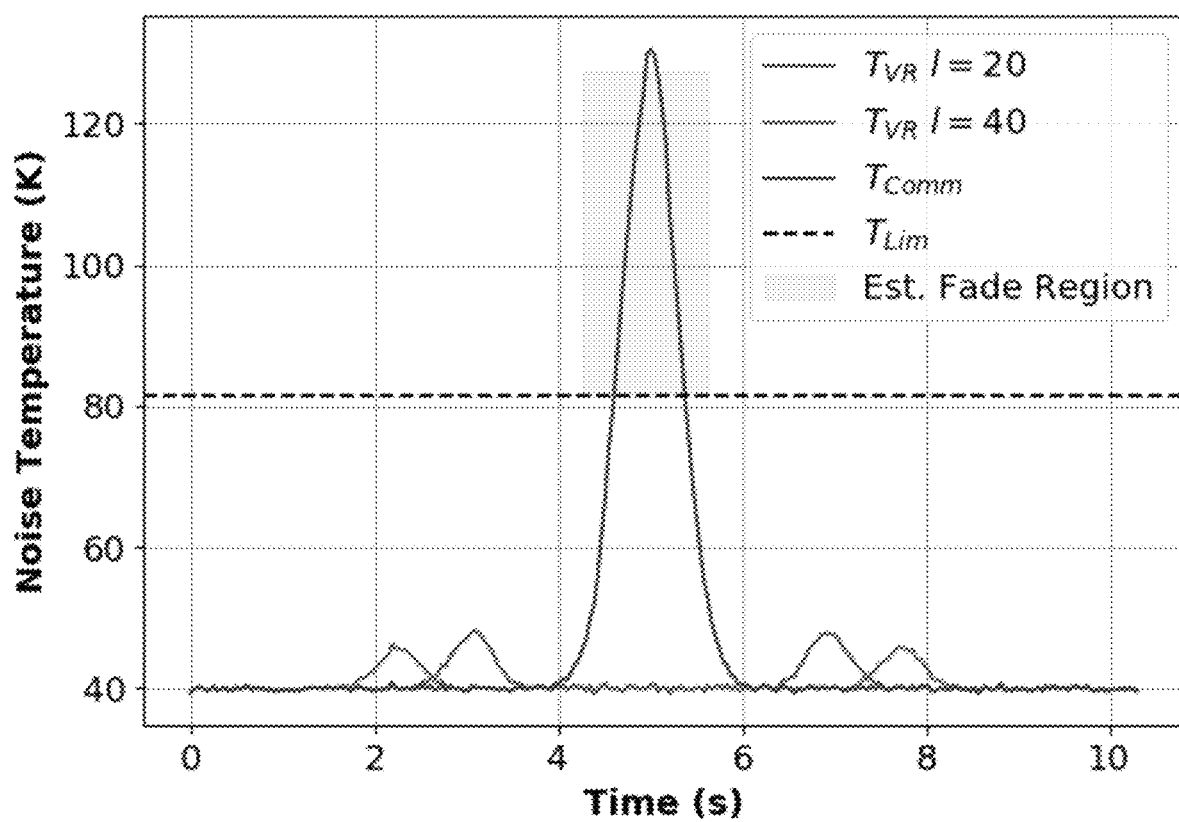
FIG. 12A is a graph illustrating time series noise temperature data for a noise source with a 15 m radius, according to an embodiment of the present invention.

In graph 1200 of FIG. 12A, for example, measured noise temperature data is shown as a function of time. Twin noise temperature peaks are visible in both VR channels, which is a result of the annular beam pattern. The central peak $T_{Comm}$ is the noise temperature present on the communication link and $T_{Lim}$ (Eq. (8)) is the noise temperature above which the Ka-Band link will fade. The shaded region denotes the region in time that the VR system estimates that a fade will occur. The top of the shaded region shows the anticipated noise temperature associated with the fade.

Figure 12B:
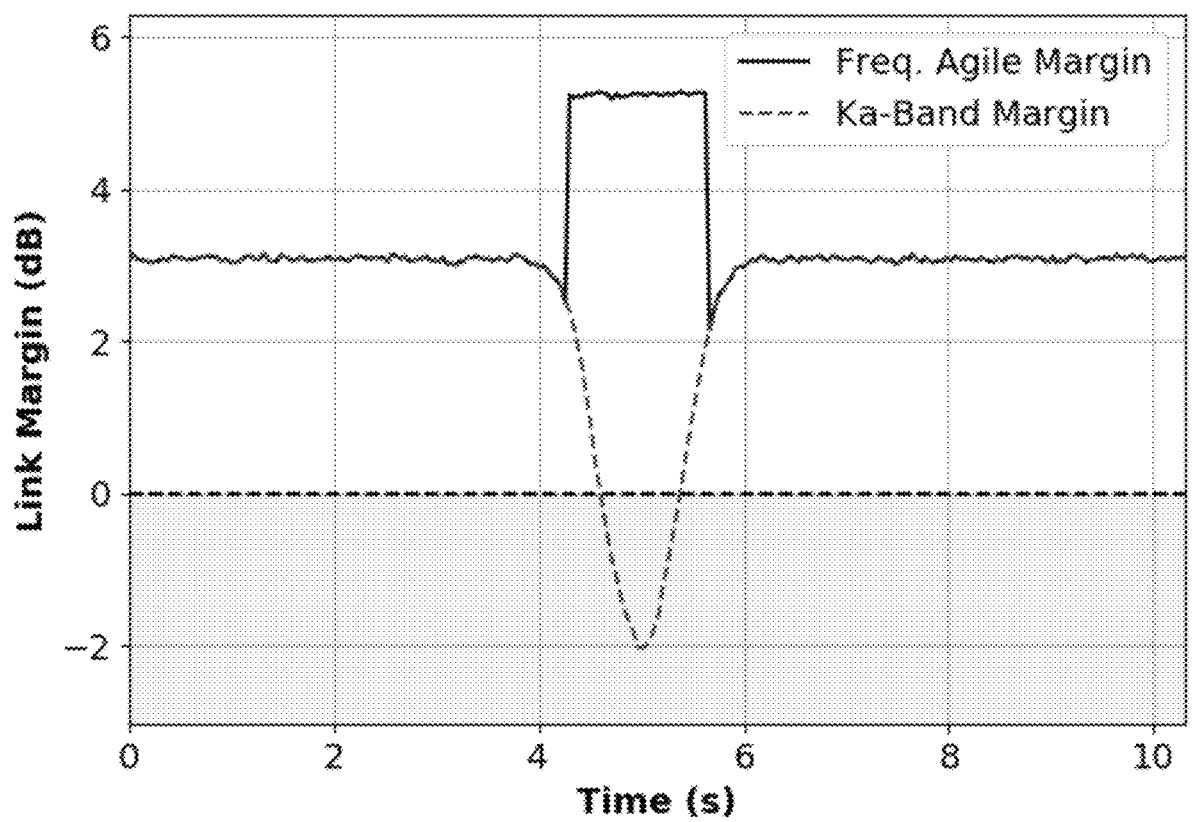
FIG. 12B is a graph illustrating link power margins with and without fade mitigation enabled in the presence of the 15 m radius noise source, according to an embodiment of the present invention.
Figure 12C:
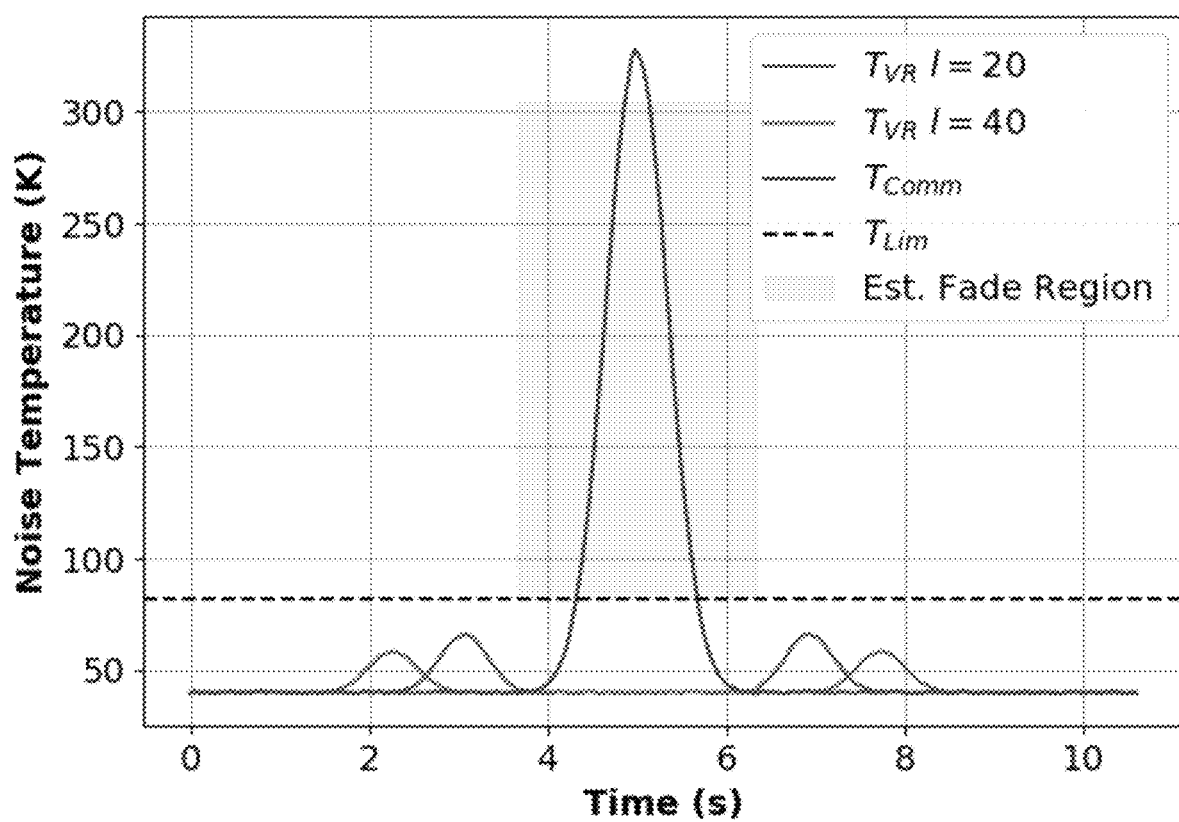
FIG. 12C is a graph illustrating time series noise temperature data for a noise source with a 30 m radius, according to an embodiment of the present invention.
Figure 12D:
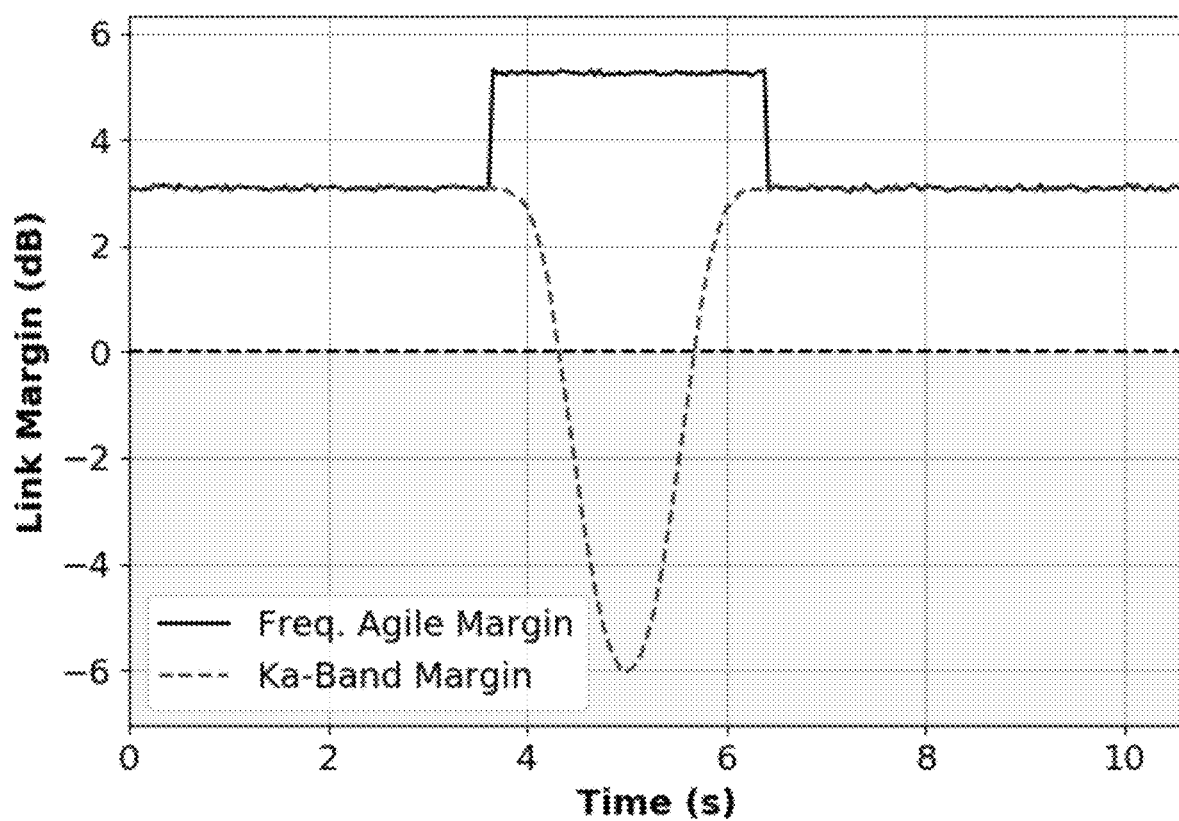
FIG. 12D is a graph illustrating link power margins with and without fade mitigation enabled in the presence of the 30 m radius noise source, according to an embodiment of the present invention.
Figure 12E:
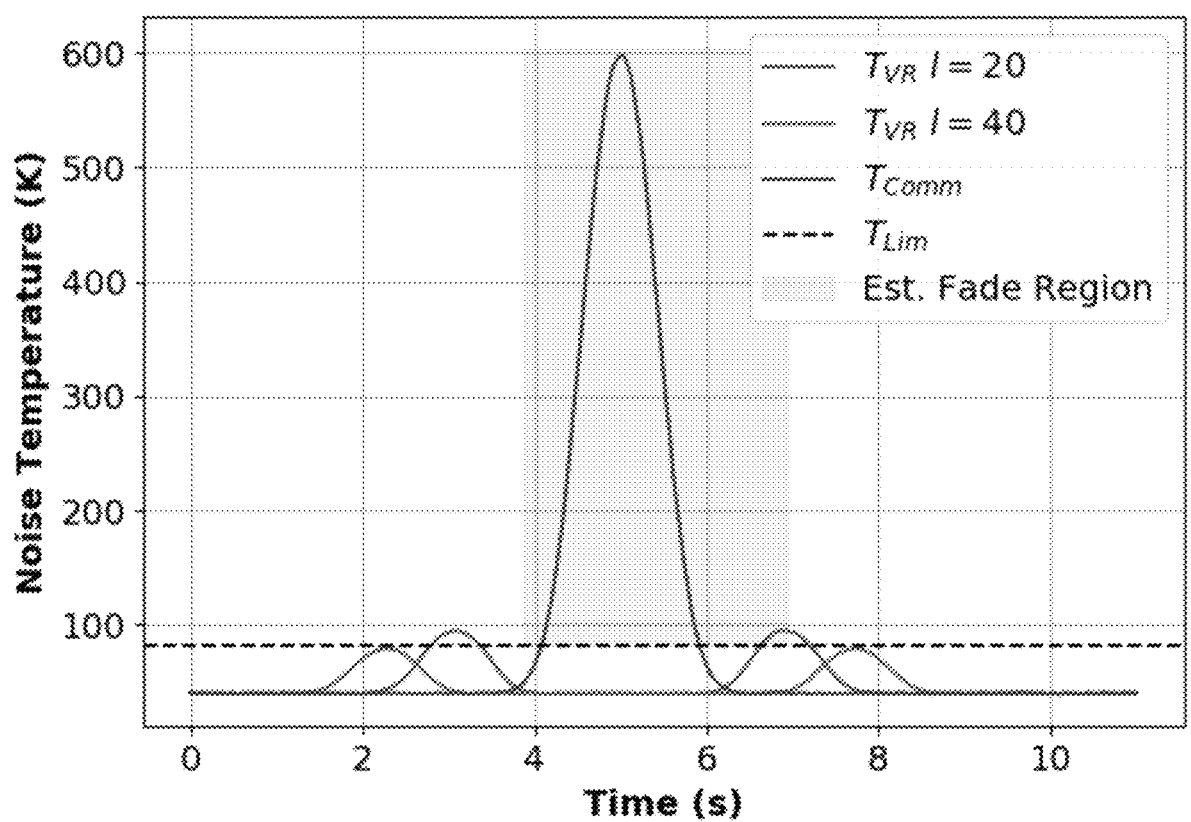
FIG. 12E is a graph illustrating time series noise temperature data for a noise source with a 50 m radius, according to an embodiment of the present invention.

Graph 1210 of FIG. 12B shows link power margins for the Ka-Band system (dashed line) and the Ka-/X-Band system (solid black line). It is clear from graph 1210 that without the cognitive antenna orchestrating a frequency change, the Ka-Band link experiences a fade. Conversely, the Ka-/X-Band link, when instructed by the VR system, is able to avert the noise source induced fade. Graphs 1220 and 1230 of FIGS. 12C and 12D show similar results to graphs 1200 and 1210, respectively, but for a 30 m noise source radius rather than a 15 m noise source radius.

Figure 12F:
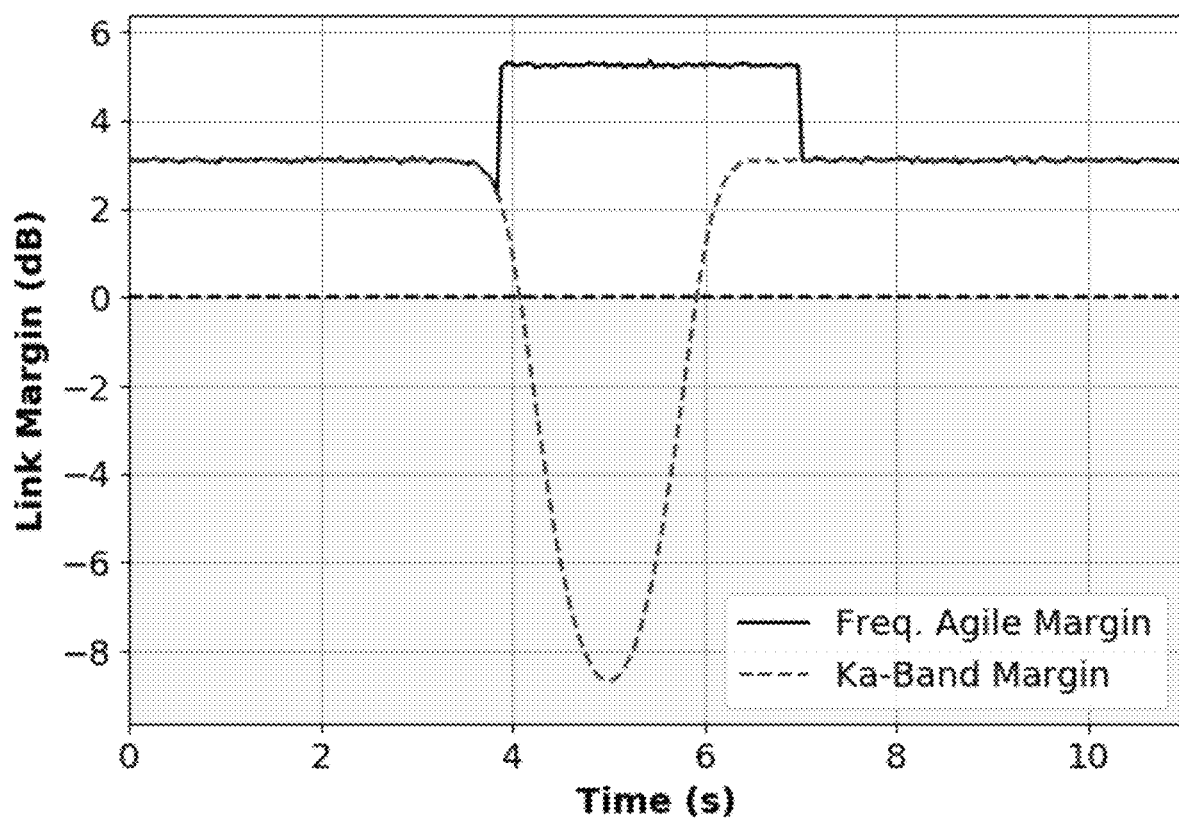
FIG. 12F is a graph illustrating link power margins with and without fade mitigation enabled in the presence of the 50 m radius noise source, according to an embodiment of the present invention.

Graph 1250 of FIG. 12F shows that the VR estimated fade region becomes asymmetrical about the peak $T_{Comm}$ noise temperature for a 50 m radius noise source. This is not due to the parameter estimate degrading, as is evident from Table III. Instead, the asymmetry is a result of the decreasing effective distance between the VR and communication link noise temperature peaks. As this effective distance decreases as a result of the noise source radius increasing, the parameter estimate is completed a later time. This is due to the need for the VR noise temperature to fall below $T_{VR_{Lim}}$, such that a Δt value (Eq. (12)) can be calculated. In the case of graph 1240 of FIG. 12E, fade mitigation is applied immediately after the parameter estimation is completed.

Figure 13A:
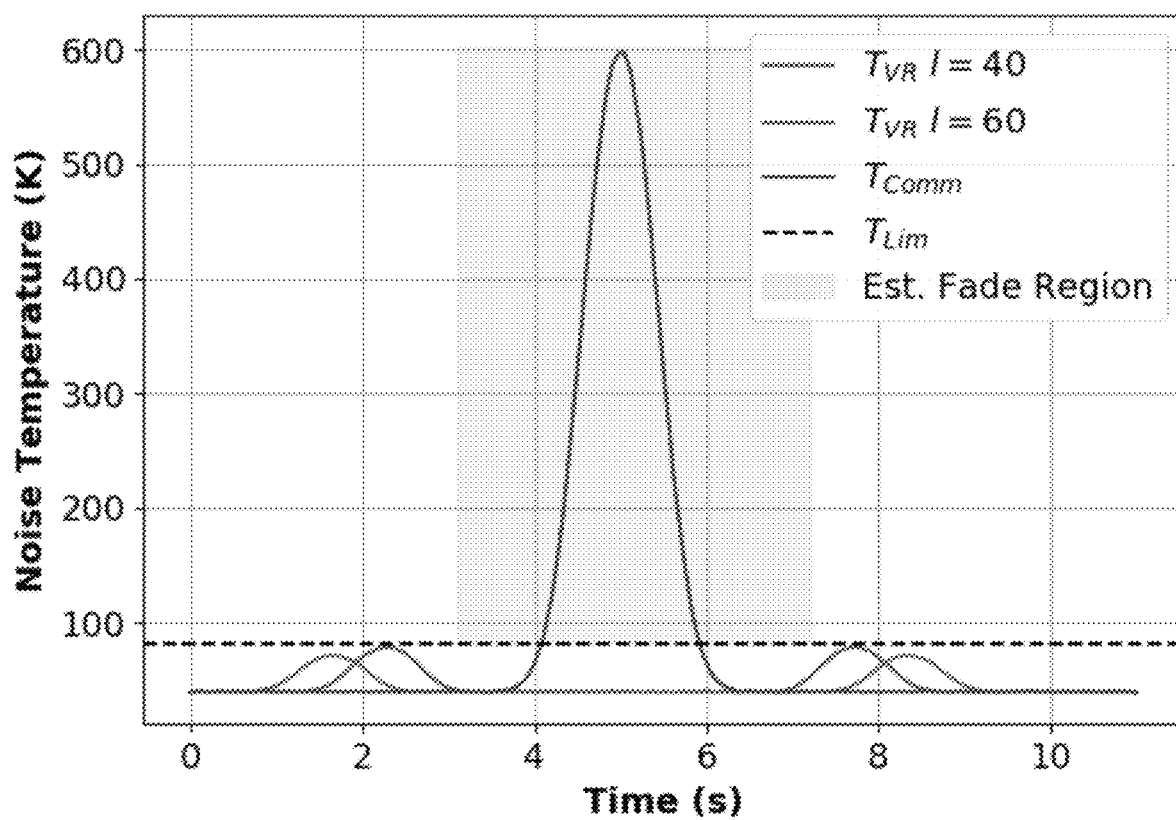
FIG. 13A is a graph illustrating time series noise temperature data for a noise source with a 50 m radius and increased VR beam diameters, according to an embodiment of the present invention.
Figure 13B:
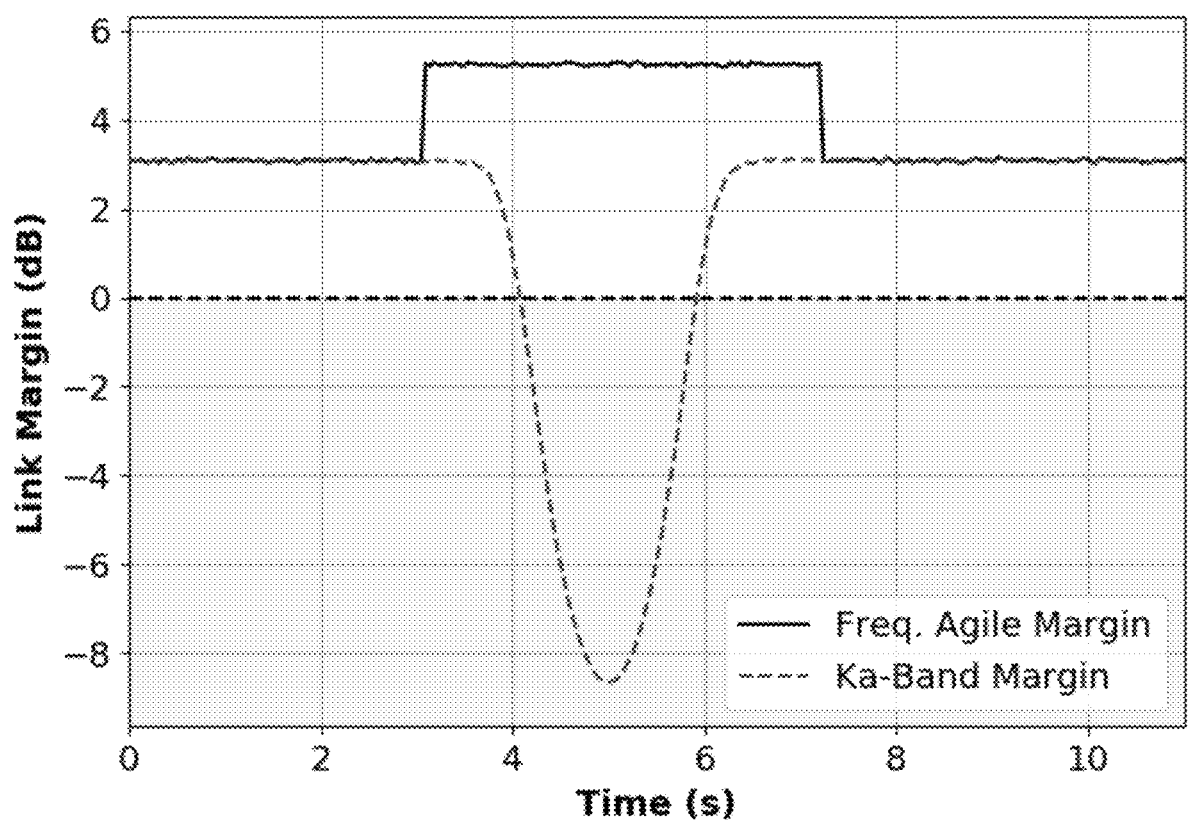
FIG. 13B is a graph illustrating link power margins with and without fade mitigation enabled in the presence of the 50 m radius noise source and increased VR beam diameters, according to an embodiment of the present invention.

The asymmetry is reduced by increasing the azimuthal mode number of the VR system. This is demonstrated in graphs 1300 and 1310 of FIGS. 13A and 13B, where the azimuthal mode number for both VR beams was increased from 20 and 40 to 40 and 60. It is clear from graph 1300 that the noise temperature peaks are detected earlier, which allows the parameter estimation routine to complete at an earlier time. This produces a more symmetrical link power margin during the frequency switch to X-Band, as seen in FIG. 13B.

In some embodiments, a VR can be used to simplify the signal calibration process of an Earth observation satellite system. These satellites use radio waves to measure properties of Earth's atmosphere and surface. In order to calibrate collected data, the satellites routinely point their radio beams away from the Earth and towards empty space. The procedure takes time, requires additional satellite maneuvering capabilities, and utilizes limited fuel or power reserves. Instead, a radiometer receiver of an Earth observation satellite can be calibrated by periodically converting the receiver into a VR by placing an SPP in front of the antenna aperture. This results in an annular beam pattern. The SPP mode number may be chosen so that the VR beam does not intersect with the Earth, but instead observes the empty space around the Earth. Hence, the calibration procedure may be conducted without repositioning the satellite.

Fade Prediction

Figure 14:
FIG. 14 is a flowchart illustrating a process for predicting and mitigating fade, according to an embodiment of the present invention.

Per the above, some embodiments may provide an early warning system for communication antennas that can measure when a fade will occur, how long the fade will persist, and how intense the fade will be. FIG. 14 is a flowchart illustrating a process 1400 for predicting and mitigating fade, according to an embodiment of the present invention. The process begins with imparting OAM onto radiometer beams via a multimodal VR at 1410. This results in annular intensity patterns with radii that scale with the OAM mode number. Radiometric data is then measured from each OAM beam of a plurality of OAM beams individually at 1420. Based on the measured radiometric data, a peak finding algorithm is employed to track a noise temperature source as the noise traverses the plurality of OAM beams at 1430. The source velocity, effective diameter, and intensity are calculated from the measured data and the noise temperature at 1440. This information is then passed to a cognitive antenna at 1450 for fade-mitigation, and the cognitive antenna selects and performs fade mitigation based on the source velocity relative to the communication link, the effective diameter, and the intensity at 1460.

A cognitive antenna can be defined as an antenna that changes its configuration in response to changes in its environment. A cognitive antenna can include: (1) a dynamically controllable antenna aperture; (2) a reconfigurable radio receiver; (3) software-defined radio (SDR); and (4) cognitive (or decision making) algorithms that control the hardware components. In this case, the VR system provides the cognitive algorithms with information about the impending fade. These algorithms utilize this information to determine whether parameters of the SDR should be adjusted (e.g., as changing the modulation or coding scheme) or if the antenna aperture should be modified, for example. Modifications by the cognitive antenna are done to maintain the communication link and maximize the amount of data received. Therefore, cognitive algorithms typically monitor the bit-error-rate (BER) or received EbNo and attempt to identify cases of link deterioration.

Figure 15:
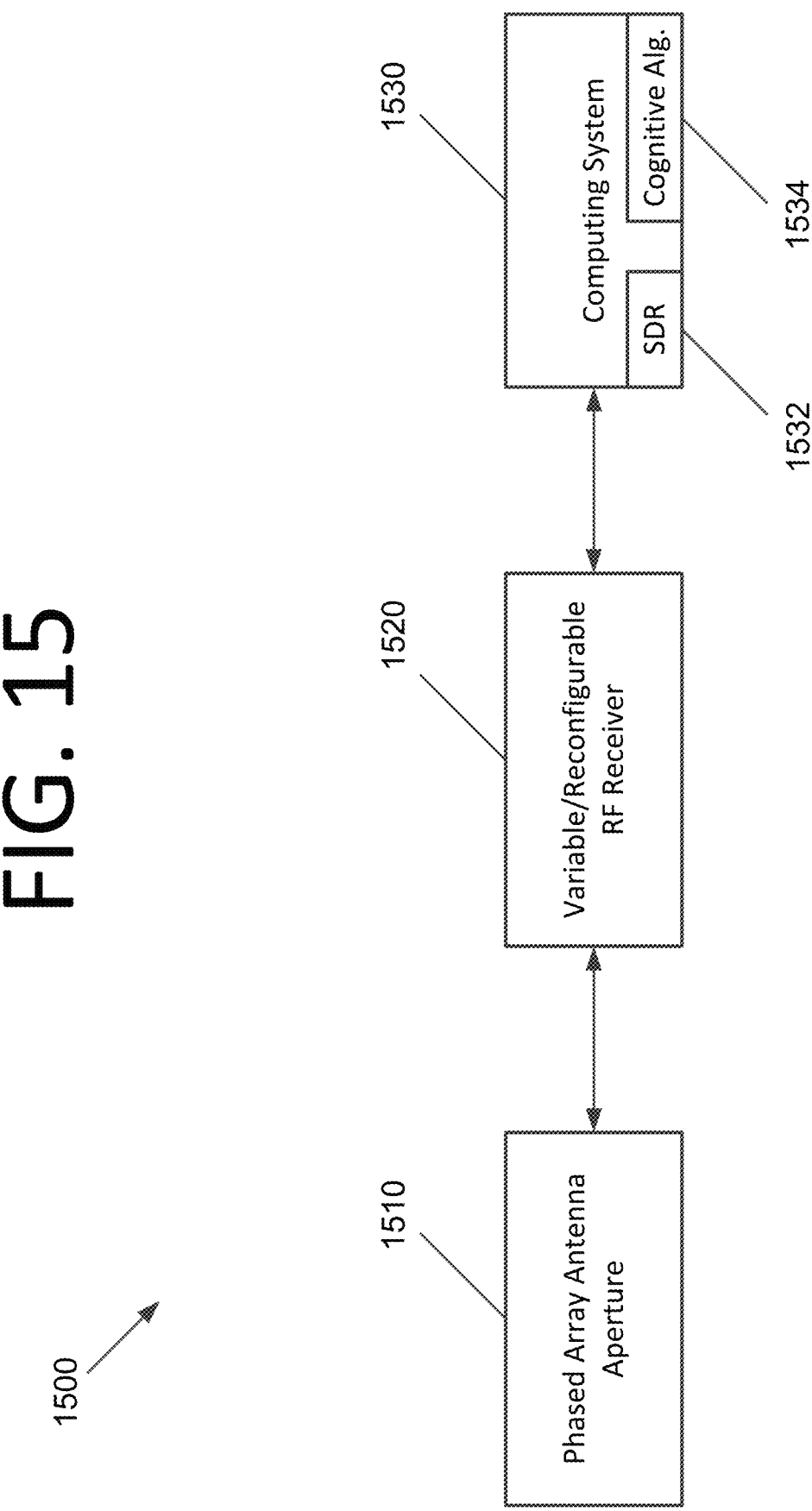
FIG. 15 is an architectural diagram illustrating a cognitive antenna system configured to perform fade prediction and mitigation, according to an embodiment of the present invention.

FIG. 15 is an architectural diagram illustrating a cognitive antenna system 1500 configured to perform fade prediction and mitigation, according to an embodiment of the present invention. System 1500 includes a phased array antenna aperture 1510, a variable l reconfigurable RF receiver 1520, and a computing system 1530 (e.g., an embedded circuit, a personal computer, a server, etc.). Variable/reconfigurable RF receiver 1520 can change the amount of signal amplification or filtering applied to the received radio waves from phased array antenna aperture 1510. Computing system 1530 includes an SDR 1532 providing a radio receiver that is dynamically reconfigurable using software. SDR 1532 may implement the functionality of mixers, filters, amplifiers, modulators l demodulators, detectors, etc. via software. Cognitive (or decision making) algorithms 1534 control the hardware components.

SUMMARY

It is demonstrated herein that noise source parameters can be extracted from noise temperature time series data measured with VR systems. Cognitive antennas can take advantage of these parameters to efficiently employ fade mitigation. This may be particularly useful in the case of small noise sources, such as UAVs and CubeSats, which pose particular interference challenges to high priority communication systems.

Multi-beam VR systems should utilize phase modulating devices, such as spiral phase plates (SPPs), that are capable of producing aberration free annular beam patterns. Such modulators should be high precision such that they that reduce dispersion of the OAM mode spectrum. The sensitivity of the VRs may be increased by developing high gain radiometers (e.g., greater than 100 dB) with relatively large bandwidths (e.g., greater than 400 MHz). This may be particularly useful for VRs producing large annular beam patterns since the gain sensitivity of such VRs is spread over a large area, thus reducing their sensitivity to small noise sources.

Next generation communication systems may base their fade mitigation strategies on measured environmental data. Proliferation of UAVs and CubeSats may make assuring link availabilities of over 99% a challenge using current techniques. Designing communication link margins based on statistical climate data will likely also become less reliable as global climate patterns shift. VRs may provide cognitive antennas with measured data to keep high priority communication links available when needed.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for predicting and mitigating fade, comprising:
    imparting orbital angular momentum (OAM) onto a plurality of radiometer beams generated via a plurality of vortex radiometers (VRs);
    measuring radiometric data from each OAM beam of the plurality of OAM beams;
    tracking a noise temperature source as noise traverses the plurality of OAM beams using a peak finding algorithm;
    calculating a source velocity relative to a communication link, an effective diameter, and an intensity from the measured radiometric data and the noise temperature; and
    selecting and performing one or more fade mitigation techniques based on the calculated source velocity, effective diameter, and intensity.

2. The method of claim 1, wherein the plurality of OAM beams exhibit annular intensity patterns with radii that scale with an OAM mode number.

3. The method of claim 1, wherein the one or more fade mitigation techniques comprise waiting to send data until the fade has ended, performing error checking and re-sending missing data, changing a communication frequency, increasing a transmission power, adjusting a modulation, adjusting a coding scheme, transmitting data to a different receiver in a network, or any combination thereof.

4. The method of claim 1, wherein the source velocity is calculated by identifying the source with a second radiometer of the plurality of radiometers using a same pointing angle as a first radiometer of the plurality of radiometers displaced by a known linear distance.

5. The method of claim 1, wherein the plurality of VRs are located along a path of the noise source.

6. The method of claim 5, further comprising:
    averaging measurements from the plurality of VRs to provide a statistical distribution of possible source velocities.

7. The method of claim 1, further comprising:
    calculating a time-of-impact (TOI) indicating when a maximum noise temperature is predicted to be recorded by the communication link, an impact initiation time (IIT) at which the communication link begins to fade, and an impact release time (IRT) at which the fade will end.

8. The method of claim 1, further comprising:
    estimating a fade persistence based on a minimum sky temperature brightness that will cause the communication link to fade, a relation between the minimum sky temperature brightness and noise temperatures recorded by the plurality of VRs, and times that the plurality of VRs recorded the noise temperatures above the minimum sky temperature brightness.

9. The method of claim 1, wherein the plurality of VRs have a gain of greater than 100 decibels and a bandwidth of greater than 400 megahertz.

10. A method for predicting and mitigating fade using a cognitive antenna, comprising:
    imparting orbital angular momentum (OAM) onto a plurality of radiometer beams generated via a plurality of vortex radiometers (VRs);
    measuring radiometric data from each OAM beam of the plurality of OAM beams;
    tracking a noise temperature source as noise traverses the plurality of OAM beams using a peak finding algorithm; and
    calculating a source velocity relative to a communication link, an effective diameter, and an intensity from the measured radiometric data and the noise temperature.

11. The method of claim 10, further comprising:
    selecting and performing one or more fade mitigation techniques based on the calculated source velocity, effective diameter, and intensity.

12. The method of claim 10, wherein the cognitive antenna comprises:
    a phased array antenna aperture configured to receive radio waves;
    a variable l reconfigurable radio frequency (RF) receiver configured to change an amount of signal amplification or filtering applied to the received radio waves from the phased array antenna aperture; and
    a computing system comprising a software-defined radio (SDR) and cognitive algorithms.

13. The method of claim 10, wherein the plurality of OAM beams exhibit annular intensity patterns with radii that scale with an OAM mode number.

14. The method of claim 10, wherein the source velocity is calculated by identifying the source with a second VR of the plurality of VRs using a same pointing angle as a first VR of the plurality of VRs displaced by a known linear distance.

15. The method of claim 10, wherein the plurality of VRs are located along a path of the noise source and the method further comprises:
    averaging measurements from the plurality of VRs to provide a statistical distribution of possible source velocities.

16. The method of claim 10, further comprising:
    calculating a time-of-impact (TOI) indicating when a maximum noise temperature is predicted to be recorded by the communication link, an impact initiation time (IIT) at which the communication link begins to fade, and an impact release time (IRT) at which the fade will end.

17. The method of claim 10, further comprising:
    estimating a fade persistence based on a minimum sky temperature brightness that will cause the communication link to fade, a relation between the minimum sky temperature brightness and noise temperatures recorded by the plurality of VRs, and times that the plurality of VRs recorded the noise temperatures above the minimum sky temperature brightness.

18. A method, comprising:

imparting orbital angular momentum (OAM) onto a plurality of radiometer beams generated via a plurality of vortex radiometers (VRs);

measuring radiometric data from each OAM beam of the plurality of OAM beams;

tracking a noise temperature source as noise traverses the plurality of OAM beams using a peak finding algorithm;

calculating a source velocity relative to a communication link, an effective diameter, and an intensity from the measured radiometric data and the noise temperature; and selecting and performing one or more fade mitigation techniques based on the calculated source velocity, effective diameter, and intensity, wherein the plurality of radiometer beams exhibit annular intensity patterns with radii that scale with an OAM mode number.

19. The method of claim 18, further comprising:

calculating a time-of-impact (TOI) indicating when a maximum noise temperature is predicted to be recorded by the communication link, an impact initiation time (IIT) at which the communication link begins to fade, and an impact release time (IRT) at which the fade will end.

20. The method of claim 18, further comprising:

estimating a fade persistence based on a minimum sky temperature brightness that will cause the communication link to fade, a relation between the minimum sky temperature brightness and noise temperatures recorded by the plurality of VRs, and times that the plurality of VRs recorded the noise temperatures above the minimum sky temperature brightness.

* * * * *